US012688761B2

(12) United States Patent
Lowther et al.

(10) Patent No.: US 12,688,761 B2
(45) Date of Patent: Jul. 21, 2026

(54) MID-AIR HAPTIC GENERATION ANALYTIC TECHNIQUES

(71) Applicant: SIM IP HXR LLC, Sunny Isles Beach, FL (US)

(72) Inventors: Will Lowther, Gloucester (GB); James Powell, Bristol (GB); Andy Martin, Bristol (GB); Ryan Page, Saltford (GB); Brian Kappus, Campbell, CA (US); Benjamin John Oliver Long, Bristol (GB)

(73) Assignee: SIM IP HXR LLC, Sunny Isles Beach, FL (US)

( * ) Notice: Subject to any disclaimer, the term of this patent is extended or adjusted under 35 U.S.C. 154(b) by 350 days.

(21) Appl. No.: 18/092,431

(22) Filed: Jan. 2, 2023

(65) Prior Publication Data

US 2023/0215248 A1 Jul. 6, 2023

Related U.S. Application Data

(60) Provisional application No. 63/268,198, filed on Feb. 18, 2022, provisional application No. 63/266,331, filed on Jan. 2, 2022.

(51) Int. Cl.
*G08B 6/00* (2006.01)

(52) U.S. Cl.
CPC .................................... *G08B 6/00* (2013.01)

(58) Field of Classification Search
CPC ............................... G08B 6/00; G10K 11/346
See application file for complete search history.

(56) References Cited

U.S. PATENT DOCUMENTS

| | | | |
|---|---|---|---|
| 4,218,921 | A | 8/1980 | Berge |
| 4,760,525 | A | 7/1988 | Webb |

(Continued)

FOREIGN PATENT DOCUMENTS

| | | | |
|---|---|---|---|
| CA | 2470115 | A1 | 6/2003 |
| CA | 2909804 | A1 | 11/2014 |

(Continued)

OTHER PUBLICATIONS

ISR for PCT/GB2020/053373 (Mar. 26, 2021) (16 pages).

(Continued)

*Primary Examiner* — Isam A Alsomiri
*Assistant Examiner* — Amie M Ndure
(74) *Attorney, Agent, or Firm* — ALSTON & BIRD LLP

(57) ABSTRACT

Mid-air ultrasonic haptic devices operate by manipulating an acoustic field to produce a haptic effect on a user. Addressing mid-air haptic devices which abstracts the most basic acoustic fundamental from that of a point to a "primitive" provides tools to adjust shape, location, and amplitude. A primitive can be designed to provide a haptic effect at the location targeted, removing the requirement of the designer needing to understand methods to create a haptic sensation. Further, a control scheme for a set of dynamic acoustic phased-array solvers is presented which enables a distributed system to compensate for unwanted time-of-flight artifacts at low cost. This is achieved by recursively subdividing the system into subtrees of phased-array nodes whose output can be estimated and the desired field drive distributed amongst the nodes. Timings of the desired field drive requests submitted to individual phased-array node inputs are then modified to compensate for the differences between wave coalescence/convergence and wave emission times, the time-of-flight, resulting in a more accurate acoustic field.

20 Claims, 10 Drawing Sheets

(56) References Cited

U.S. PATENT DOCUMENTS

| | | | |
|---|---|---|---|
| 4,771,205 | A | 9/1988 | Mequio |
| 4,881,212 | A | 11/1989 | Takeuchi |
| 5,122,993 | A | 6/1992 | Hikita |
| 5,226,000 | A | 7/1993 | Moses |
| 5,235,986 | A | 8/1993 | Maslak |
| 5,243,344 | A | 9/1993 | Koulopoulos |
| 5,329,682 | A | 7/1994 | Thurn |
| 5,371,834 | A | 12/1994 | Tawel |
| 5,422,431 | A | 6/1995 | Ichiki |
| 5,426,388 | A | 6/1995 | Flora |
| 5,477,736 | A | 12/1995 | Lorraine |
| 5,511,296 | A | 4/1996 | Dias |
| 5,729,694 | A | 3/1998 | Holzrichter |
| 5,859,915 | A | 1/1999 | Norris |
| 6,029,518 | A | 2/2000 | Oeftering |
| 6,193,936 | B1 | 2/2001 | Gardner |
| 6,216,538 | B1 | 4/2001 | Yasuda |
| 6,436,051 | B1 | 8/2002 | Morris |
| 6,503,204 | B1 | 1/2003 | Sumanaweera |
| 6,533,455 | B2 | 3/2003 | Graumann |
| 6,647,359 | B1 | 11/2003 | Verplank |
| 6,771,294 | B1 | 8/2004 | Pulli |
| 6,772,490 | B2 | 8/2004 | Toda |
| 6,800,987 | B2 | 10/2004 | Toda |
| 7,107,159 | B2 | 9/2006 | German |
| 7,109,789 | B2 | 9/2006 | Spencer |
| 7,154,928 | B2 | 12/2006 | Sandstrom |
| 7,182,726 | B2 | 2/2007 | Williams |
| 7,225,404 | B1 | 5/2007 | Zilles |
| 7,284,027 | B2 | 10/2007 | Jennings, III |
| 7,345,600 | B1 | 3/2008 | Fedigan |
| 7,487,662 | B2 | 2/2009 | Schabron |
| 7,497,662 | B2 | 3/2009 | Mollmann |
| 7,577,260 | B1 | 8/2009 | Hooley |
| 7,692,661 | B2 | 4/2010 | Cook |
| RE42,192 | E | 3/2011 | Schabron |
| 7,966,134 | B2 | 6/2011 | German |
| 8,000,481 | B2 | 8/2011 | Nishikawa |
| 8,123,502 | B2 | 2/2012 | Blakey |
| 8,269,168 | B1 | 9/2012 | Axelrod |
| 8,279,193 | B1 | 10/2012 | Birnbaum |
| 8,351,646 | B2 | 1/2013 | Fujimura |
| 8,369,973 | B2 | 2/2013 | Risbo |
| 8,594,350 | B2 | 11/2013 | Hooley |
| 8,607,922 | B1 | 12/2013 | Werner |
| 8,782,109 | B2 | 7/2014 | Tsutsui |
| 8,823,674 | B2 | 9/2014 | Birnbaum |
| 8,833,510 | B2 | 9/2014 | Koh |
| 8,884,927 | B1 | 11/2014 | Cheatham, III |
| 9,208,664 | B1 | 12/2015 | Peters |
| 9,267,735 | B2 | 2/2016 | Funayama |
| 9,421,291 | B2 | 8/2016 | Robert |
| 9,612,658 | B2 | 4/2017 | Subramanian |
| 9,662,680 | B2 | 5/2017 | Yamamoto |
| 9,667,173 | B1 | 5/2017 | Kappus |
| 9,786,092 | B2 | 10/2017 | Santhanam |
| 9,795,446 | B2 | 10/2017 | Dimaio |
| 9,816,757 | B1 | 11/2017 | Zielinski |
| 9,841,819 | B2 * | 12/2017 | Carter ..................... G06F 3/167 |
| 9,863,699 | B2 | 1/2018 | Corbin, III |
| 9,898,089 | B2 | 2/2018 | Subramanian |
| 9,936,908 | B1 | 4/2018 | Acosta |
| 9,945,818 | B2 | 4/2018 | Ganti |
| 9,958,943 | B2 | 5/2018 | Long |
| 9,977,120 | B2 | 5/2018 | Carter |
| 10,101,811 | B2 | 10/2018 | Carter |
| 10,101,814 | B2 | 10/2018 | Carter |
| 10,133,353 | B2 | 11/2018 | Eid |
| 10,140,776 | B2 | 11/2018 | Schwarz |
| 10,146,353 | B1 | 12/2018 | Smith |
| 10,168,782 | B1 | 1/2019 | Tchon |
| 10,268,275 | B2 | 4/2019 | Carter |
| 10,281,567 | B2 | 5/2019 | Carter |
| 10,318,008 | B2 | 6/2019 | Sinha |
| 10,383,694 | B1 | 8/2019 | Venkataraman |
| 10,444,842 | B2 | 10/2019 | Long |
| 10,469,973 | B2 | 11/2019 | Hayashi |
| 10,496,175 | B2 | 12/2019 | Long |
| 10,497,358 | B2 | 12/2019 | Tester |
| 10,510,357 | B2 | 12/2019 | Kovesi |
| 10,520,252 | B2 | 12/2019 | Momen |
| 10,523,159 | B2 | 12/2019 | Megretski |
| 10,531,212 | B2 | 1/2020 | Long |
| 10,535,174 | B1 | 1/2020 | Rigiroli |
| 10,569,300 | B2 | 2/2020 | Hoshi |
| 10,593,101 | B1 | 3/2020 | Han |
| 10,599,434 | B1 | 3/2020 | Barrett |
| 10,657,704 | B1 | 5/2020 | Han |
| 10,685,538 | B2 | 6/2020 | Carter |
| 10,755,538 | B2 | 8/2020 | Carter |
| 10,818,162 | B2 | 10/2020 | Carter |
| 10,911,861 | B2 | 2/2021 | Buckland |
| 10,915,177 | B2 | 2/2021 | Carter |
| 10,921,890 | B2 | 2/2021 | Subramanian |
| 10,930,123 | B2 | 2/2021 | Carter |
| 10,943,578 | B2 | 3/2021 | Long |
| 10,991,074 | B2 | 4/2021 | Bousmalis |
| 11,048,329 | B1 | 6/2021 | Lee |
| 11,080,874 | B1 | 8/2021 | Bardagjy |
| 11,098,951 | B2 | 8/2021 | Kappus |
| 11,106,273 | B2 | 8/2021 | Hazra |
| 11,113,860 | B2 | 9/2021 | Rigiroli |
| 11,125,866 | B2 | 9/2021 | Sumi |
| 11,169,610 | B2 | 11/2021 | Sarafianou |
| 11,189,140 | B2 | 11/2021 | Long |
| 11,204,644 | B2 | 12/2021 | Long |
| 11,276,281 | B2 | 3/2022 | Carter |
| 11,334,165 | B1 | 5/2022 | Clements |
| 11,350,909 | B2 | 6/2022 | Maresca |
| 11,475,247 | B2 | 10/2022 | Nikolenko |
| 11,531,395 | B2 | 12/2022 | Kappus |
| 11,543,507 | B2 | 1/2023 | Carter |
| 11,550,395 | B2 | 1/2023 | Beattie |
| 11,550,432 | B2 * | 1/2023 | Carter ........................ G06F 3/16 |
| 11,553,295 | B2 | 1/2023 | Kappus |
| 11,669,661 | B2 | 6/2023 | Mirzendehdel |
| 11,693,113 | B2 | 7/2023 | Bachmann |
| 11,704,983 | B2 | 7/2023 | Long |
| 11,714,492 | B2 | 8/2023 | Carter |
| 11,715,453 | B2 | 8/2023 | Kappus |
| 11,727,790 | B2 | 8/2023 | Carter |
| 11,740,018 | B2 | 8/2023 | Kappus |
| 11,742,870 | B2 | 8/2023 | Long |
| 11,768,540 | B2 | 9/2023 | Long |
| 11,816,267 | B2 | 11/2023 | Kappus |
| 11,830,351 | B2 | 11/2023 | Carter |
| 11,830,352 | B1 | 11/2023 | Agrawal |
| 11,842,517 | B2 | 12/2023 | Lyons |
| 11,886,639 | B2 | 1/2024 | Brown |
| 11,921,928 | B2 | 3/2024 | Iodice |
| 11,955,109 | B2 | 4/2024 | Long |
| 12,100,288 | B2 | 9/2024 | Carter |
| 12,158,522 | B2 | 12/2024 | Iodice |
| 2001/0007591 | A1 | 7/2001 | Pompei |
| 2001/0033124 | A1 | 10/2001 | Norris |
| 2001/0053204 | A1 | 12/2001 | Navab |
| 2002/0149570 | A1 | 10/2002 | Knowles |
| 2003/0024317 | A1 | 2/2003 | Miller |
| 2003/0144032 | A1 | 7/2003 | Brunner |
| 2003/0182647 | A1 | 9/2003 | Radeskog |
| 2004/0005715 | A1 | 1/2004 | Schabron |
| 2004/0014434 | A1 | 1/2004 | Haardt |
| 2004/0052387 | A1 | 3/2004 | Norris |
| 2004/0091119 | A1 | 5/2004 | Duraiswami |
| 2004/0210158 | A1 | 10/2004 | Organ |
| 2004/0226378 | A1 | 11/2004 | Oda |
| 2004/0264707 | A1 | 12/2004 | Yang |
| 2005/0052714 | A1 | 3/2005 | Klug |
| 2005/0056851 | A1 | 3/2005 | Althaus |
| 2005/0148874 | A1 | 7/2005 | Brock-Fisher |
| 2005/0212760 | A1 | 9/2005 | Marvit |
| 2005/0226437 | A1 | 10/2005 | Pellegrini |
| 2005/0267695 | A1 | 12/2005 | German |
| 2005/0273483 | A1 | 12/2005 | Dent |

(56) References Cited

U.S. PATENT DOCUMENTS

2006/0085049 A1 4/2006 Cory
2006/0090955 A1 5/2006 Cardas
2006/0091301 A1 5/2006 Trisnadi
2006/0164428 A1 7/2006 Cook
2007/0036492 A1 2/2007 Lee
2007/0056374 A1 3/2007 Andrews
2007/0094317 A1 4/2007 Wang
2007/0177681 A1 8/2007 Choi
2007/0214462 A1 9/2007 Boillot
2007/0216711 A1 9/2007 Smith
2007/0236450 A1 10/2007 Colgate
2007/0263741 A1 11/2007 Erving
2008/0012647 A1 1/2008 Risbo
2008/0027686 A1 1/2008 Mollmann
2008/0084789 A1 4/2008 Altman
2008/0130906 A1 6/2008 Goldstein
2008/0152191 A1 6/2008 Fujimura
2008/0226088 A1 9/2008 Aarts
2008/0273723 A1 11/2008 Hartung
2008/0291198 A1 11/2008 Chun
2008/0300055 A1 12/2008 Lutnick
2009/0093724 A1 4/2009 Pernot
2009/0116660 A1 5/2009 Croft, III
2009/0232684 A1 9/2009 Hirata
2009/0251421 A1 10/2009 Bloebaum
2009/0319065 A1 12/2009 Risbo
2010/0013613 A1 1/2010 Weston
2010/0016727 A1 1/2010 Rosenberg
2010/0030076 A1 2/2010 Vortman
2010/0044120 A1 2/2010 Richter
2010/0066512 A1 3/2010 Rank
2010/0085168 A1 4/2010 Kyung
2010/0103246 A1 4/2010 Schwerdtner
2010/0109481 A1 5/2010 Buccafusca
2010/0199232 A1 8/2010 Mistry
2010/0231508 A1 9/2010 Cruz-Hernandez
2010/0262008 A1 10/2010 Roundhill
2010/0265191 A1* 10/2010 Mui .................... G06F 3/04886
345/173
2010/0302015 A1 12/2010 Kipman
2010/0321216 A1 12/2010 Jonsson
2011/0006888 A1 1/2011 Bae
2011/0010958 A1 1/2011 Clark
2011/0051554 A1 3/2011 Varray
2011/0066032 A1 3/2011 Shuki
2011/0134225 A1 6/2011 Saint-Pierre
2011/0199342 A1 8/2011 Vartanian
2011/0310028 A1 12/2011 Camp, Jr.
2012/0057733 A1 3/2012 Morii
2012/0063628 A1 3/2012 Rizzello
2012/0066280 A1 3/2012 Tsutsui
2012/0113223 A1 5/2012 Hilliges
2012/0223880 A1 9/2012 Birnbaum
2012/0229400 A1 9/2012 Birnbaum
2012/0229401 A1 9/2012 Birnbaum
2012/0236689 A1 9/2012 Brown
2012/0243374 A1 9/2012 Dahl
2012/0249409 A1 10/2012 Toney
2012/0249474 A1 10/2012 Pratt
2012/0299853 A1* 11/2012 Dagar ................. G06F 3/04886
345/173
2012/0307649 A1 12/2012 Park
2012/0315605 A1 12/2012 Cho
2013/0035582 A1 2/2013 Radulescu
2013/0079621 A1 3/2013 Shoham
2013/0094678 A1 4/2013 Scholte
2013/0100008 A1 4/2013 Marti
2013/0101141 A1 4/2013 Mcelveen
2013/0173658 A1 7/2013 Adelman
2013/0271397 A1 10/2013 Macdougall
2013/0331705 A1 12/2013 Fraser
2014/0027201 A1 1/2014 Islam
2014/0104274 A1 4/2014 Hilliges
2014/0139071 A1 5/2014 Yamamoto
2014/0168091 A1 6/2014 Jones
2014/0201666 A1 7/2014 Bedikian
2014/0204002 A1 7/2014 Bennet
2014/0265572 A1 9/2014 Siedenburg
2014/0267065 A1 9/2014 Levesque
2014/0269207 A1 9/2014 Baym
2014/0269208 A1 9/2014 Baym
2014/0269214 A1 9/2014 Baym
2014/0270305 A1 9/2014 Baym
2014/0306891 A1 10/2014 Latta
2014/0320436 A1 10/2014 Modarres
2014/0361988 A1 12/2014 Katz
2014/0369514 A1 12/2014 Baym
2015/0002477 A1 1/2015 Cheatham, III
2015/0002517 A1 1/2015 Lee
2015/0003204 A1* 1/2015 Cheatham, III ........ G06F 3/016
367/93
2015/0005039 A1 1/2015 Liu
2015/0006645 A1 1/2015 Oh
2015/0007025 A1 1/2015 Sassi
2015/0013023 A1 1/2015 Wang
2015/0019299 A1 1/2015 Harvey
2015/0022466 A1 1/2015 Levesque
2015/0029155 A1 1/2015 Lee
2015/0066445 A1 3/2015 Lin
2015/0070147 A1 3/2015 Cruz-Hernandez
2015/0070245 A1 3/2015 Han
2015/0078136 A1 3/2015 Sun
2015/0081110 A1 3/2015 Houston
2015/0084929 A1 3/2015 Lee
2015/0110310 A1 4/2015 Minnaar
2015/0130323 A1 5/2015 Harris
2015/0168205 A1 6/2015 Lee
2015/0187134 A1 7/2015 Baecher
2015/0189455 A1* 7/2015 Donaldson ............. H04R 27/00
381/77
2015/0189457 A1* 7/2015 Donaldson .............. H04M 3/56
381/1
2015/0192995 A1 7/2015 Subramanian
2015/0209564 A1 7/2015 Lewin
2015/0220199 A1 8/2015 Wang
2015/0226537 A1 8/2015 Schorre
2015/0226831 A1 8/2015 Nakamura
2015/0241393 A1 8/2015 Ganti
2015/0248787 A1 9/2015 Abovitz
2015/0258431 A1 9/2015 Stafford
2015/0277610 A1 10/2015 Kim
2015/0293592 A1 10/2015 Cheong
2015/0304789 A1 10/2015 Babayoff
2015/0309629 A1 10/2015 Amariutei
2015/0323667 A1 11/2015 Przybyla
2015/0331576 A1 11/2015 Piya
2015/0332075 A1 11/2015 Burch
2016/0019762 A1 1/2016 Levesque
2016/0019879 A1 1/2016 Daley
2016/0026253 A1 1/2016 Bradski
2016/0044417 A1 2/2016 Clemen, Jr.
2016/0124080 A1 5/2016 Carter
2016/0138986 A1 5/2016 Carlin
2016/0175701 A1 6/2016 Froy
2016/0175709 A1 6/2016 Idris
2016/0189702 A1 6/2016 Blanc
2016/0242724 A1 8/2016 Lavallee
2016/0246374 A1* 8/2016 Carter ...................... G08B 6/00
2016/0249150 A1 8/2016 Carter
2016/0291716 A1 10/2016 Boser
2016/0306423 A1 10/2016 Uttermann
2016/0320843 A1 11/2016 Long
2016/0339132 A1 11/2016 Cosman
2016/0358477 A1 12/2016 Ansari
2016/0374562 A1 12/2016 Vertikov
2017/0002839 A1 1/2017 Bukland
2017/0004819 A1* 1/2017 Ochiai ................... G10K 15/02
2017/0018171 A1 1/2017 Carter
2017/0024921 A1 1/2017 Beeler
2017/0052148 A1 2/2017 Estevez
2017/0123487 A1 5/2017 Hazra
2017/0123499 A1 5/2017 Eid
2017/0140552 A1 5/2017 Woo
2017/0144190 A1 5/2017 Hoshi

(56) References Cited

U.S. PATENT DOCUMENTS

| | | | |
|---|---|---|---|
| 2017/0153707 | A1 | 6/2017 | Subramanian |
| 2017/0168586 | A1 | 6/2017 | Sinha |
| 2017/0181725 | A1 | 6/2017 | Han |
| 2017/0193768 | A1 | 7/2017 | Long |
| 2017/0193823 | A1 | 7/2017 | Jiang |
| 2017/0211022 | A1 | 7/2017 | Reinke |
| 2017/0236506 | A1 | 8/2017 | Przybyla |
| 2017/0249932 | A1 | 8/2017 | Maxwell |
| 2017/0270356 | A1 | 9/2017 | Sills |
| 2017/0279951 | A1 | 9/2017 | Hwang |
| 2017/0336860 | A1 | 11/2017 | Smoot |
| 2017/0366908 | A1 | 12/2017 | Long |
| 2018/0018787 | A1 | 1/2018 | Giancola |
| 2018/0035891 | A1 | 2/2018 | Van Soest |
| 2018/0039333 | A1 | 2/2018 | Carter |
| 2018/0047259 | A1 | 2/2018 | Carter |
| 2018/0074580 | A1 | 3/2018 | Hardee |
| 2018/0081439 | A1 | 3/2018 | Daniels |
| 2018/0101234 | A1 | 4/2018 | Carter |
| 2018/0139557 | A1 | 5/2018 | Ochiai |
| 2018/0146306 | A1 | 5/2018 | Benattar |
| 2018/0151035 | A1 | 5/2018 | Maalouf |
| 2018/0166063 | A1 | 6/2018 | Long |
| 2018/0181203 | A1 | 6/2018 | Subramanian |
| 2018/0182372 | A1 | 6/2018 | Tester |
| 2018/0190007 | A1 | 7/2018 | Panteleev |
| 2018/0246576 | A1 | 8/2018 | Long |
| 2018/0253627 | A1 | 9/2018 | Baradel |
| 2018/0263708 | A1 | 9/2018 | Kim |
| 2018/0267156 | A1 | 9/2018 | Carter |
| 2018/0271494 | A1 | 9/2018 | Cuscuna |
| 2018/0304310 | A1 | 10/2018 | Long |
| 2018/0309515 | A1 | 10/2018 | Murakowski |
| 2018/0310111 | A1 | 10/2018 | Kappus |
| 2018/0350339 | A1 | 12/2018 | Macours |
| 2018/0361174 | A1 | 12/2018 | Radulescu |
| 2019/0001129 | A1 | 1/2019 | Rosenbluth |
| 2019/0038496 | A1 | 2/2019 | Levesque |
| 2019/0091565 | A1 | 3/2019 | Nelson |
| 2019/0163275 | A1 | 5/2019 | Iodice |
| 2019/0175077 | A1 | 6/2019 | Zhang |
| 2019/0187244 | A1 | 6/2019 | Riccardi |
| 2019/0196578 | A1 | 6/2019 | Iodice |
| 2019/0196591 | A1 | 6/2019 | Long |
| 2019/0197840 | A1 | 6/2019 | Kappus |
| 2019/0197841 | A1 | 6/2019 | Carter |
| 2019/0197842 | A1 | 6/2019 | Long |
| 2019/0204925 | A1 | 7/2019 | Long |
| 2019/0206202 | A1 | 7/2019 | Carter |
| 2019/0235628 | A1 | 8/2019 | Lacroix |
| 2019/0257932 | A1 | 8/2019 | Carter |
| 2019/0310710 | A1 | 10/2019 | Deeley |
| 2019/0342654 | A1 | 11/2019 | Buckland |
| 2020/0042091 | A1 | 2/2020 | Long |
| 2020/0080776 | A1 | 3/2020 | Kappus |
| 2020/0082221 | A1 | 3/2020 | Tsai |
| 2020/0082804 | A1 | 3/2020 | Kappus |
| 2020/0103974 | A1 | 4/2020 | Carter |
| 2020/0117229 | A1 | 4/2020 | Long |
| 2020/0117993 | A1 | 4/2020 | Martinez-Canales |
| 2020/0193269 | A1 | 6/2020 | Park |
| 2020/0218354 | A1 | 7/2020 | Beattie |
| 2020/0257371 | A1 | 8/2020 | Sung |
| 2020/0285888 | A1 | 9/2020 | Borar |
| 2020/0294299 | A1 | 9/2020 | Rigiroli |
| 2020/0302760 | A1 | 9/2020 | Carter |
| 2020/0320347 | A1 | 10/2020 | Nikolenko |
| 2020/0320351 | A1 | 10/2020 | Nikolenko |
| 2020/0327418 | A1 | 10/2020 | Lyons |
| 2020/0380832 | A1 | 12/2020 | Carter |
| 2021/0037332 | A1 | 2/2021 | Kappus |
| 2021/0043070 | A1 | 2/2021 | Carter |
| 2021/0056693 | A1 | 2/2021 | Cheng |
| 2021/0109712 | A1 | 4/2021 | Long |
| 2021/0111731 | A1 | 4/2021 | Long |
| 2021/0112353 | A1 | 4/2021 | Kappus |
| 2021/0141458 | A1 | 5/2021 | Sarafianou |
| 2021/0162457 | A1 | 6/2021 | Ebefors |
| 2021/0165491 | A1 | 6/2021 | Sun |
| 2021/0170447 | A1 | 6/2021 | Buckland |
| 2021/0183215 | A1 | 6/2021 | Carter |
| 2021/0201884 | A1 | 7/2021 | Kappus |
| 2021/0225355 | A1 | 7/2021 | Long |
| 2021/0275141 | A1 | 9/2021 | Eckersley |
| 2021/0294419 | A1 | 9/2021 | Lee |
| 2021/0303072 | A1 | 9/2021 | Carter |
| 2021/0303758 | A1 | 9/2021 | Long |
| 2021/0334706 | A1 | 10/2021 | Yamaguchi |
| 2021/0381765 | A1 | 12/2021 | Kappus |
| 2021/0397261 | A1 | 12/2021 | Kappus |
| 2022/0000447 | A1 | 1/2022 | Eibl |
| 2022/0035479 | A1 | 2/2022 | Lasater |
| 2022/0083142 | A1 | 3/2022 | Brown |
| 2022/0095068 | A1 | 3/2022 | Kappus |
| 2022/0113806 | A1 | 4/2022 | Long |
| 2022/0155949 | A1 | 5/2022 | Ring |
| 2022/0198892 | A1 | 6/2022 | Carter |
| 2022/0236806 | A1 | 7/2022 | Carter |
| 2022/0252550 | A1 | 8/2022 | Catsis |
| 2022/0300028 | A1 | 9/2022 | Long |
| 2022/0300070 | A1 | 9/2022 | Iodice |
| 2022/0329250 | A1 | 10/2022 | Long |
| 2022/0393095 | A1 | 12/2022 | Chilles |
| 2023/0036123 | A1 | 2/2023 | Long |
| 2023/0075917 | A1 | 3/2023 | Pittera |
| 2023/0087395 | A1 | 3/2023 | Borar |
| 2023/0117919 | A1 | 4/2023 | Iodice |
| 2023/0124704 | A1 | 4/2023 | Buckland |
| 2023/0141896 | A1 | 5/2023 | Liu |
| 2023/0168228 | A1 | 6/2023 | Kappus |
| 2023/0228857 | A1 | 7/2023 | Carter |
| 2023/0251720 | A1 | 8/2023 | Wren |
| 2023/0259213 | A1 | 8/2023 | Long |
| 2023/0298444 | A1 | 9/2023 | Kappus |
| 2023/0360504 | A1 | 11/2023 | Kappus |
| 2023/0368771 | A1 | 11/2023 | Kappus |
| 2023/0378966 | A1 | 11/2023 | Long |
| 2024/0021072 | A1 | 1/2024 | Carter |
| 2024/0036652 | A1 | 2/2024 | Yamada |
| 2024/0056655 | A1 | 2/2024 | Page |
| 2024/0069640 | A1 | 2/2024 | Long |
| 2024/0095953 | A1 | 3/2024 | Lyons |
| 2024/0096183 | A1 | 3/2024 | Carter |
| 2024/0129655 | A1 | 4/2024 | Chilles |
| 2024/0135789 | A1 | 4/2024 | Long |
| 2024/0157399 | A1 | 5/2024 | Buckland |
| 2024/0231492 | A1 | 7/2024 | Beattie |
| 2024/0265907 | A1 | 8/2024 | Long |
| 2024/0288945 | A1 | 8/2024 | Long |
| 2024/0296825 | A1 | 9/2024 | Long |
| 2024/0402809 | A1 | 12/2024 | Kappus |
| 2024/0402996 | A1 | 12/2024 | Long |
| 2024/0411374 | A1 | 12/2024 | Wren |

FOREIGN PATENT DOCUMENTS

| | | | |
|---|---|---|---|
| CN | 101986787 | | 3/2011 |
| CN | 102459900 | | 5/2012 |
| CN | 102591512 | | 7/2012 |
| CN | 103797379 | | 5/2014 |
| CN | 103984414 | A | 8/2014 |
| CN | 107340871 | A | 11/2017 |
| CN | 107407969 | A | 11/2017 |
| CN | 107534810 | A | 1/2018 |
| CN | 108780642 | A | 11/2018 |
| CN | 116034422 | A | 4/2023 |
| EP | 0057594 | A2 | 8/1982 |
| EP | 309003 | | 3/1989 |
| EP | 0696670 | A1 | 2/1996 |
| EP | 1875081 | A1 | 1/2008 |
| EP | 1911530 | | 4/2008 |
| EP | 2271129 | A1 | 1/2011 |
| EP | 1461598 | B1 | 4/2014 |
| EP | 3207817 | A1 | 8/2017 |

(56) References Cited

FOREIGN PATENT DOCUMENTS

| | | | |
|---|---|---|---|
| EP | 3216231 | B1 | 8/2019 |
| EP | 3916525 | | 12/2021 |
| GB | 2464117 | | 4/2010 |
| GB | 2513884 | A | 11/2014 |
| GB | 2530036 | | 3/2016 |
| JP | 2008074075 | | 4/2008 |
| JP | 2010109579 | | 5/2010 |
| JP | 2011172074 | | 9/2011 |
| JP | 2012048378 | A | 3/2012 |
| JP | 5477736 | B2 | 4/2014 |
| JP | 2015035657 | A | 2/2015 |
| JP | 2016035646 | | 3/2016 |
| JP | 2017168086 | | 9/2017 |
| JP | 6239796 | | 11/2017 |
| KR | 20120065779 | | 6/2012 |
| KR | 20130055972 | | 5/2013 |
| KR | 1020130055972 | | 5/2013 |
| KR | 20160008280 | | 1/2016 |
| KR | 20200082449 | A | 7/2020 |
| TW | 201308837 | | 2/2013 |
| WO | 9118486 | | 11/1991 |
| WO | 9639754 | | 12/1996 |
| WO | 03050511 | A | 6/2003 |
| WO | 2005017965 | | 2/2005 |
| WO | 2007144801 | A2 | 12/2007 |
| WO | 2009071746 | A1 | 6/2009 |
| WO | 2009112866 | | 9/2009 |
| WO | 2010003836 | | 1/2010 |
| WO | 2010139916 | | 12/2010 |
| WO | 2011132012 | A1 | 10/2011 |
| WO | 2012023864 | | 2/2012 |
| WO | 2012104648 | A1 | 8/2012 |
| WO | 2013179179 | | 12/2013 |
| WO | 2014181084 | A1 | 11/2014 |
| WO | 2015006467 | | 1/2015 |
| WO | 2015039622 | | 3/2015 |
| WO | 2015127335 | | 8/2015 |
| WO | 2015194510 | | 12/2015 |
| WO | 2016007920 | | 1/2016 |
| WO | 2016073936 | | 5/2016 |
| WO | 2016095033 | A1 | 6/2016 |
| WO | 2016099279 | | 6/2016 |
| WO | 2016132141 | | 8/2016 |
| WO | 2016132144 | | 8/2016 |
| WO | 2016137675 | | 9/2016 |
| WO | 2016162058 | | 10/2016 |
| WO | 2016171651 | | 10/2016 |
| WO | 2017172006 | | 10/2017 |
| WO | 2018000731 | A1 | 1/2018 |
| WO | 2018109466 | A1 | 6/2018 |
| WO | 2018168562 | A1 | 9/2018 |
| WO | 2019190894 | | 10/2019 |
| WO | 2020049321 | A2 | 3/2020 |
| WO | 2021130505 | A1 | 7/2021 |
| WO | 2021260373 | A1 | 12/2021 |
| WO | 2021262343 | | 12/2021 |

OTHER PUBLICATIONS

Iwamoto et al. (2008), Non-contact Method for Producing Tactile Sensation Using Airborne Ultrasound, EuroHaptics, pp. 504-513.

Iwamoto et al., Airborne Ultrasound Tactile Display: Supplement, The University of Tokyo 2008 (2 pages).

Iwamoto T et al, "Two-dimensional Scanning Tactile Display using Ultrasound Radiation Pressure", Haptic Interfaces for Virtual Environment and Teleoperator Systems, 2006 14th Symposium on Alexandria, VA, USA Mar. 25-26, 2006, Piscataway, NJ, USA, IEEE, (Mar. 25, 2006), ISBN 978-1-4244-0226-7, pp. 57-61.

Jager et al., "Air-Coupled 40-KHZ Ultrasonic 2D-Phased Array Based on a 3D-Printed Waveguide Structure", 2017 IEEE, 4 pages.

Japanese Office Action (with English language translation) for Application No. 2017-514569, dated Mar. 31, 2019, 10 pages.

JonasChatel-Goldman, Touch increases autonomic coupling between romantic partners, Frontiers in Behavioral Neuroscience Mar. 2014, vol. 8, Article 95.

Jonathan Taylor et al., Articulated Distance Fields for Ultra-Fast Tracking of Hands Interacting, ACM Transactions on Graphics, vol. 36, No. 4, Article 244, Publication Date: Nov. 2017, pp. 1-12.

Jonathan Taylor et al., Efficient and Precise Interactive Hand Tracking Through Joint, Continuous Optimization of Pose and Correspondences, SIGGRAPH '16 Technical Paper, Jul. 24-28, 2016, Anaheim, CA, ISBN: 978-1-4503-4279-87/16/07, pp. 1-12.

Jonathan Tompson et al., Real-Time Continuous Pose Recovery of Human Hands Using Convolutional Networks, ACM Trans. Graph. 33, 5, Article 169, Aug. 2014, pp. 1-10.

K. Jia, Dynamic properties of micro-particles in ultrasonic transportation using phase-controlled standing waves, J. Applied Physics 116, n. 16 (2014) (12 pages).

Kai Tsumoto, Presentation of Tactile Pleasantness Using Airborne Ultrasound, 2021 IEEE World Haptics Conference (WHC) Jul. 6-9, 2021. Montreal, Canada.

Kaiming He et al., Deep Residual Learning for Image Recognition, http://image-net.org/challenges/LSVRC/2015/ and http://mscoco.org/dataset/#detections-challenge2015, Dec. 10, 2015, pp. 1-12.

Kamakura, T. and Aoki, K. (2006) "A Highly Directional Audio System using a Parametric Array in Air" WESPAC IX 2006 (8 pages).

Keisuke Hasegawa, Electronically steerable ultrasound-driven long narrow air stream, Applied Physics Letters 111, 064104 (2017).

Keisuke Hasegawa, Midair Ultrasound Fragrance Rendering, IEEE Transactions on Visualization and Computer Graphics, vol. 24, No. 4, Apr. 2018 1477.

Keisuke Hasegawa,, Curved acceleration path of ultrasound-driven air flow, J. Appl. Phys. 125, 054902 (2019).

Kolb, et al., "Time-of-Flight Cameras in Computer Graphics," Computer Graphics forum, vol. 29 (2010), No. 1, pp. 141-159.

Konstantinos Bousmalis et al., Domain Separation Networks, 29th Conference on Neural Information Processing Sysgtems (NIPS 2016), Barcelona, Spain. Aug. 22, 2016, pp. 1-15.

Krim, et al., "Two Decades of Array Signal Processing Research—The Parametric Approach", IEEE Signal Processing Magazine, Jul. 1996, pp. 67-94.

Lang, Robert, "3D Time-of-Flight Distance Measurement with Custom Solid-State Image Sensors in CMOS/CCD—Technology", A dissertation submitted to Department of EE and CS at Univ. of Siegen, dated Jun. 28, 2000, 223 pages.

Large et al.,Feel the noise: Mid-air ultrasound haptics as a novel human-vehicle Interaction paradigm, Applied Ergonomics (2019) (10 pages).

Li, Larry, "Time-of-Flight Camera—An Introduction," Texas Instruments, Technical White Paper, SLOA190B—Jan. 2014 Revised May 2014, 10 pages.

Light, E.D., Progress in Two Dimensional Arrays for Real Time Volumetric Imaging, 1998 (17 pages).

Line S Loken, Coding of pleasant touch by unmyelinated afferents in humans, Nature Neuroscience vol. 12 [ No. 5 [ May 2009 547.

M. Barmatz et al, "Acoustic radiation potential on a sphere in plane, cylindrical, and spherical standing wave fields", The Journal of the Acoustical Society of America, New York, NY, US, (Mar. 1, 1985), vol. 77, No. 3, pp. 928-945, XP055389249.

M. Toda, New Type of Matching Layer for Air-Coupled Ultrasonic Transducers, IEEE Transactions on Ultrasonics, Ferroelecthcs, and Frequency Control, vol. 49, No. 7, Jul. 2002 (8 pages).

Mahboob, "Artificial neural networks for learning inverse kinematics of humanoid robot arms." MS Thesis, 2015. (Year: 2015) 95 pages.

Mahdi Rad et al., Feature Mapping for Learning Fast and Accurate 3D Pose Inference from Synthetic Images, Mar. 26, 2018, pp. 1-14.

Marco A B Andrade et al., "Matrix method for acoustic levitation simulation", IEEE Transactions on Ultrasonics, Ferroelectrics and Frequency Control, IEEE, US, (Aug. 1, 2011), vol. 58, No. 8, ISSN 0885-3010, pp. 1674-1683.

Mariana von Mohr, The soothing function of touch: affective touch reduces feelings of social exclusion, Scientific Reports, 7: 13516, Oct. 18, 2017.

(56) References Cited

OTHER PUBLICATIONS

Marin, About LibHand, LibHand—A Hand Articulation Library, www.libhand.org/index.html, Mar. 26, 2020, pp. 1-2; www.libhand.org/download.html, 1 page; www.libhand.org/examples.html, pp. 1-2.
Markus Oberweger et al., DeepPrior++: Improving Fast and Accurate 3D Hand Pose Estimation, Aug. 28, 2017, pp. 1-10.
Markus Oberweger et al., Hands Deep in Deep Learning for Hand Pose Estimation, Dec. 2, 2016, pp. 1-10.
Marshall, M ., Carter, T., Alexander, J., & Subramanian, S. (2012). Ultratangibles: creating movable tangible objects on interactive tables. In Proceedings of the 2012 ACM annual conference on Human Factors in Computing Systems, (pp. 2185-2188).
Marzo et al., Holographic acoustic elements for manipulation of levitated objects, Nature Communications Doi: 10.1038/ncomms9661 (2015) (7 pages).
Meijster, A., et al., "A General Algorithm for Computing Distance Transforms in Linear Time," Mathematical Morphology and its Applications to Image and Signal Processing, 2002, pp. 331-340.
Mingzhu Lu et al. (2006) Design and experiment of 256-element ultrasound phased array for noninvasive focused ultrasound surgery, Ultrasonics, vol. 44, Supplement, Dec. 22, 2006, pp. e325-e330.
Mitsuru Nakajima, Remotely Displaying Cooling Sensation via Ultrasound-Driven Air Flow, Haptics Symposium 2018, San Francisco, USA p. 340.
Mohamed Yacine Tsalamlal, Affective Communication through Air Jet Stimulation: Evidence from Event-Related Potentials, International Journal of Human-Computer Interaction 2018.
Mohamed Yacine Tsalamlal, Non-Intrusive Haptic Interfaces: State-of-the Art Survey, HAID 2013, LNCS 7989, pp. 1-9, 2013.
Mueller, GANerated Hands for Real-Time 3D Hand Tracking from Monocular RGB, Eye in-Painting with Exemplar Generative Adverserial Networks, pp. 49-59 (Jun. 1, 2018).
Nina Gaissert, Christian Wallraven, and Heinrich H. Bulthoff, "Visual and Haptic Perceptual Spaces Show High Similarity in Humans ", published to Journal of Vision in 2010, available at http://www.journalofvision.org/content/10/11/2 and retrieved on Apr. 22, 2020 ( Year: 2010), 20 pages.
Notice of Allowance dated Apr. 20, 2021 for U.S. Appl. No. 16/563,608 (pp. 1-5).
Notice of Allowance dated Apr. 22, 2020 for U.S. Appl. No. 15/671,107 (pp. 1-5).
Notice of Allowance dated Dec. 19, 2018 for U.S. Appl. No. 15/665,629 (pp. 1-9).
Notice of Allowance dated Dec. 21, 2018 for U.S. Appl. No. 15/983,864 (pp. 1-7).
Notice of Allowance dated Feb. 10, 2020, for U.S. Appl. No. 16/160,862 (pp. 1-9).
Notice of Allowance dated Feb. 7, 2019 for U.S. Appl. No. 15/851,214 (pp. 1-7).
Notice of Allowance dated Jul. 22, 2021 for U.S. Appl. No. 16/600,500 (pp. 1-9).
Office Action (Notice of Allowance and Fees Due (PTOL-85) dated Sep. 12, 2022 for U.S. Appl. No. 16/734,479 (pp. 1-7).
Office Action (Notice of Allowance and Fees Due (PTOL-85)) dated Oct. 31, 2022 for U.S. Appl. No. 17/068,834 (pp. 1-2).
Office Action (Notice of Allowance and Fees Due (PTOL-85)) dated Oct. 31, 2022 for U.S. Appl. No. 17/176,899 (pp. 1-2).
Office Action (Notice of Allowance and Fees Due (PTOL-85)) dated Nov. 1, 2022 for U.S. Appl. No. 16/404,660 (pp. 1-5).
Office Action (Notice of Allowance and Fees Due (PTOL-85)) dated Nov. 2, 2022 for U.S. Appl. No. 16/734,479 (pp. 1-2).
Office Action (Notice of Allowance and Fees Due (PTOL-85)) dated Nov. 10, 2022 for U.S. Appl. No. 16/198,959 (pp. 1-2).
Office Action (Notice of Allowance and Fees Due (PTOL-85)) dated Nov. 16, 2022 for U.S. Appl. No. 16/404,660 (pp. 1-2).
Office Action (Notice of Allowance and Fees Due (PTOL-85) dated Dec. 14, 2021 for U.S. Appl. No. 17/170,841 (pp. 1-8).
Office Action dated Apr. 8, 2020, for U.S. Appl. No. 16/198,959 (pp. 1-17).
Office Action dated Apr. 16, 2020 for U.S. Appl. No. 15/839,184 (pp. 1-8).
Office Action dated Apr. 17, 2020 for U.S. Appl. No. 16/401,148 (pp. 1-15).
Office Action dated Apr. 18, 2019 for U.S. Appl. No. 16/296,127 (pp. 1-6).
Office Action dated Apr. 28, 2020 for U.S. Appl. No. 15/396,851 (pp. 1-12).
Office Action dated Apr. 29, 2020 for U.S. Appl. No. 16/374,301 (pp. 1-18).
Office Action dated Apr. 4, 2019 for U.S. Appl. No. 15/897,804 (pp. 1-10).
Office Action dated Aug. 10, 2021 for U.S. Appl. No. 16/564,016 (pp. 1-14).
Office Action dated Aug. 19, 2021 for U.S. Appl. No. 17/170,841 (pp. 1-9).
Office Action dated Aug. 22, 2019 for U.S. Appl. No. 16/160,862 (pp. 1-5).
Office Action dated Aug. 9, 2021 for U.S. Appl. No. 17/068,825 (pp. 1-9).
Office Action dated Dec. 11, 2019 for U.S. Appl. No. 15/959,266 (pp. 1-15).
Office Action dated Dec. 7, 2020 for U.S. Appl. No. 16/563,608 (pp. 1-8).
Office Action dated Feb. 20, 2019 for U.S. Appl. No. 15/623,516 (pp. 1-8).
Office Action dated Feb. 25, 2020 for U.S. Appl. No. 15/960,113 (pp. 1-7).
Office Action dated Feb. 7, 2020 for U.S. Appl. No. 16/159,695 (pp. 1-8).
Office Action dated Jan. 10, 2020 for U.S. Appl. No. 16/228,767 (pp. 1-6).
Office Action dated Jan. 29, 2020 for U.S. Appl. No. 16/198,959 (p. 1-6).
Office Action dated Jul. 10, 2019 for U.S. Appl. No. 15/210,661 (pp. 1-12).
Office Action dated Jul. 26, 2019 for U.S. Appl. No. 16/159,695 (pp. 1-8).
Office Action dated Jul. 9, 2020 for U.S. Appl. No. 16/228,760 (pp. 1-17).
Office Action dated Jun. 19, 2020 for U.S. Appl. No. 16/699,629 (pp. 1-12).
Office Action dated Jun. 25, 2020 for U.S. Appl. No. 16/228,767 (pp. 1-27).
Office Action dated Jun. 25, 2021 for U.S. Appl. No. 16/899,720 (pp. 1-5).
Office Action dated Mar. 11, 2021 for U.S. Appl. No. 16/228,767 (pp. 1-23).
Office Action dated Mar. 20, 2020 for U.S. Appl. No. 15/210,661 (pp. 1-10).
Office Action dated Mar. 31, 2021 for U.S. Appl. No. 16/228,760 (pp. 1-21).
Office Action dated May 13, 2021 for U.S. Appl. No. 16/600,500 (pp. 1-9).
Office Action dated May 14, 2021 for U.S. Appl. No. 16/198,959 (pp. 1-6).
Office Action dated May 16, 2019 for U.S. Appl. No. 15/396,851 (pp. 1-7).
Office Action dated May 18, 2020 for U.S. Appl. No. 15/960,113 (pp. 1-21).
Office Action dated Oct. 17, 2019 for U.S. Appl. No. 15/897,804 (pp. 1-10).
Office Action dated Oct. 29, 2021 for U.S. Appl. No. 16/198,959 (pp. 1-7).
Office Action dated Oct. 31, 2019 for U.S. Appl. No. 15/671,107 (pp. 1-6).
Office Action dated Oct. 7, 2019 for U.S. Appl. No. 15/396,851 (pp. 1-9).
Office Action dated Sep. 16, 2021 for U.S. Appl. No. 16/600,496 (pp. 1-8).
Office Action dated Sep. 18, 2020 for U.S. Appl. No. 15/396,851 (pp. 1-14).

(56) References Cited

OTHER PUBLICATIONS

Office Action dated Sep. 21, 2020 for U.S. Appl. No. 16/198,959 (pp. 1-17).
Office Action dated Sep. 24, 2021 for U.S. Appl. No. 17/080,840 (pp. 1-9).
OGRECave/ogre—GitHub: ogre/Samples/Media/materials at 7de80a7483f20b50f2b10d7ac6de9d9c6c87d364, Mar. 26, 2020, 1 page.
Oikonomidis et al., "Efficient model-based 3D tracking of hand articulations using Kinect." In BmVC, vol. 1, No. 2, p. 3. 2011. (Year: 2011).
Optimal regularisation for acoustic source reconstruction by inverse methods, Y. Kim, P.A. Nelson, Institute of Sound and Vibration Research, University of Southampton, Southampton, SO17 1BJ, UK; 25 pages.
"Welcome to Project Soli" video, https://atap.google.com/#project-soli Accessed Nov. 30, 2018, 2 pages.
A. B. Vallbo, Receptive field characteristics of tactile units with myelinated afferents in hairy skin of human subjects, Journal of Physiology (1995), 483.3, pp. 783-795.
A. Sand, Head-Mounted Display with Mid-Air Tactile Feedback, Proceedings of the 21st ACM Symposium on Virtual Reality Software and Technology, Nov. 13-15, 2015 (8 pages).
Al-Mashhadany, "Inverse Kinematics Problem (IKP) of 6-DOF Manipulator by Locally Recurrent Neural Networks (LRNNs)," Management and Service Science (MASS), International Conference on Management and Service Science., IEEE, Aug. 24, 2010, 5 pages. (Year: 2010).
Alexander, J. et al. (2011), Adding Haptic Feedback to Mobile TV (6 pages).
Almusawi et al., "A new artificial neural network approach in solving inverse kinematics of robotic arm (denso vp6242)." Computational intelligence and neuroscience 2016 (2016). (Year: 2016).
Amanda Zimmerman, The gentle touch receptors of mammalian skin, Science, Nov. 21, 2014, vol. 346 Issue 6212, p. 950.
Anonymous: "How does Ultrahaptics technology work?—Ultrahaptics Developer Information", Jul. 31, 2018 (Jul. 31, 2018), XP055839320, Retrieved from the Internet: URL:https://developer.ultrahaptics.com/knowledgebase/haptics-overview/ [retrieved on Sep. 8, 2021].
Aoki et al., Sound location of stero reproduction with parametric loudspeakers, Applied Acoustics 73 (2012) 1289-1295 (7 pages).
Ashish Shrivastava et al., Learning from Simulated and Unsupervised Images through Adversarial Training, Jul. 19, 2017, pp. 1-16.
Azad et al., Deep domain adaptation under deep label scarcity. arXiv preprint arXiv:1809.08097 (2018) (Year: 2018).
Bajard et al., BKM: A New Hardware Algorithm for Complex Elementary Functions, 8092 IEEE Transactions on Computers 43 (1994) (9 pages).
Bajard et al., Evaluation of Complex Elementary Functions / A New Version of BKM, SPIE Conference on Advanced Signal Processing, Jul. 1999 (8 pages).
Benjamin Long et al, "Rendering volumetric haptic shapes in mid-air using ultrasound", ACM Transactions on Graphics (TOG), ACM, US, (Nov. 19, 2014), vol. 33, No. 6, ISSN 0730-0301, pp. 1-10.
Beranek, L., & Mellow, T. (2019). Acoustics: Sound Fields, Transducers and Vibration. Academic Press, 3 pages.
Bortoff et al., Pseudolinearization of the Acrobot using Spline Functions, IEEE Proceedings of the 31st Conference on Decision and Control, Sep. 10, 1992 (6 pages).
Boureau et al., "A theoretical analysis of feature pooling in visual recognition." In Proceedings of the 27th international conference on machine learning (ICML-10), pp. 111-118. 2010. (Year: 2010).
Bożena Smagowska & Małgorzata Pawlaczyk-Łuszczyńska (2013) Effects of Ultrasonic Noise on the Human Body—A Bibliographic Review, International Journal of Occupational Safety and Ergonomics, 19:2, 195-202.
Brian Kappus and Ben Long, Spatiotemporal Modulation for Mid-Air Haptic Feedback from an Ultrasonic Phased Array, ICSV25, Hiroshima, Jul. 8-12, 2018, 6 pages.
Bybi, A., Grondel, S., Mzerd, A., Granger, C., Garoum, M., & Assaad, J. (2019). Investigation of cross-coupling in piezoelectric transducer arrays and correction. International Journal of Engineering and Technology Innovation, 9(4), 287.
Canada Application 2,909,804 Office Action dated Oct. 18, 2019, 4 pages.
Casper et al., Realtime Control of Multiple-focus Phased Array Heating Patterns Based on Noninvasive Ultrasound Thermography, IEEE Trans Biomed Eng. Jan. 2012; 59(1): 95-105.
Certon, D., Felix, N., Hue, P. T. H., Patat, F., & Lethiecq, M. (Oct. 1999). Evaluation of laser probe performances for measuring cross-coupling in 1-3 piezocomposite arrays. In 1999 IEEE Ultrasonics Symposium. Proceedings. International Symposium (Cat. No. 99CH37027) (vol. 2, pp. 1091-1094).
Certon, D., Felix, N., Lacaze, E., Teston, F., & Patat, F. (2001). Investigation of cross-coupling in 1-3 piezocomposite arrays. IEEE transactions on ultrasonics, ferroelectrics, and frequency control, 48(1), 85-92.
Chang Suk Lee et al., An electrically switchable visible to infra-red dual frequency cholesteric liquid crystal light shutter. J. Mater. Chem. C, 2018, 6, 4243 (7 pages).
Christoper M. Bishop, Pattern Recognition and Machine Learning, 2006, pp. 1-758.
Colgan, A., "How Does the Leap Motion Controller Work?" Leap Motion, Aug. 9, 2014, 10 pages.
Communication Pursuant to Article 94(3) EPC for EP 19723179.8 (15-Feb. 2022), 10 pages.
Corrected Notice of Allowability dated Aug. 9, 2021 for U.S. Appl. No. 15/396,851 (pp. 1-6).
Corrected Notice of Allowability dated Jan. 14, 2021 for U.S. Appl. No. 15/897,804 (pp. 1-2).
Corrected Notice of Allowability dated Jun. 21, 2019 for U.S. Appl. No. 15/966,213 (2 pages).
Corrected Notice of Allowability dated Nov. 24, 2021 for U.S. Appl. No. 16/600,500 (pp. 1-5).
Corrected Notice of Allowability dated Oct. 31, 2019 for U.S. Appl. No. 15/623,516 (pp. 1-2).
Damn Geeky, "Virtual projection keyboard technology with haptic feedback on palm of your hand," May 30, 2013, 4 pages.
David Joseph Tan et al., Fits like a Glove: Rapid and Reliable Hand Shape Personalization, 2016 IEEE Conference on Computer Vision and Pattern Recognition, pp. 5610-5619.
Definition of "Interferometry"according to Wikipedia, 25 pages., Retrieved Nov. 2018.
Definition of "Multilateration" according to Wikipedia, 7 pages., Retrieved Nov. 2018.
Definition of"Trilateration"according to Wikipedia, 2 pages., Retrieved Nov. 2018.
Der et al., Inverse kinematics for reduced deformable models. ACM Transactions on graphics (TOG) 25, No. 3 (2006): 1174-1179. (Year: 2006).
Desilets, C. S. (1978). Transducer arrays suitable for acoustic imaging (No. GL-2833). Stanford Univ CA Edward L Ginzton Lab of Physics. 5 pages.
Diederik P. Kingma et al., Adam: A Method for Stochastic Optimization, Jan. 30, 2017, pp. 1-15.
Duka, "Neural network based inverse kinematics solution for trajectory tracking of a robotic arm." Procedia Technology 12 (2014) 20-27. (Year: 2014).
E. Bok, Metasurface for Water-to-Air Sound Transmission, Physical Review Letters 120, 044302 (2018) (6 pages).
E.S. Ebbini et al. (1991), A spherical-section ultrasound phased array applicator for deep localized hyperthermia, Biomedical Engineering, IEEE Transactions on (vol. 38 Issue: 7), pp. 634-643.
EPO 21186570.4 Extended Search Report dated Oct. 29, 2021, 10 pages.
EPO Application 18 725 358.8 Examination Report Dated Sep. 22, 2021, 15 pages.
EPO Communication for Application 18 811 906.9 (Nov. 29, 2021) (15 pages).

(56) References Cited

OTHER PUBLICATIONS

EPO Examination Report 17 748 4656.4 (Jan. 12, 2021) (16 pages).
EPO Examination Search Report 17 702 910.5 (Jun. 23, 2021) 10 pages.
EPO ISR and WO for PCT/GB2022/050204 (Apr. 7, 2022) (15 pages).
"Ryoko Takahashi, Keisuke Hasegawa, Hiroyuki Shinoda, Tactile Stimulation by Repetitive Lateral Movement of Midair Ultrasound Focus, Apr.-Jun. 2020, IEEE Transactions on Haptics, vol. 13, No. 2 " (Year: 2020) 9 pages.
Bjørn Kolbrek, Modal Propagat Ion in Acous T ic Horns (Jun. 2012) (127 pages).
Chen, Xi. "Real-time Action Recognition for RGB-D and Motion Capture Data." (2014). (Year: 2014) 107 pages.
Kavan et al. (Dual Quaternions for Rigid Transformation Blending, 2006, ResearchGate, pp. 2-11) (Year: 2006).
Kussaba et al. (Hybrid kinematic control for rigid body pose stabilization using dual quaternions, Journal of the Franklin Institute 354 (2017) 2769-2787) (Year: 2017).
Notice of Allowance dated Sep. 16, 2024 for U.S. Appl. No. 18/305,354 (pp. 1-9).
Office Action (Final Rejection) dated Jun. 27, 2024 for U.S. Appl. No. 18/188,584 (pp. 1-5).
Office Action (Final Rejection) dated Aug. 1, 2024 for U.S. Appl. No. 18/305,354 (pp. 1-10).
Office Action (Non-Final Rejection) dated Jun. 4, 2024 for U.S. Appl. No. 18/348,663 (pp. 1-18).
Office Action (Non-Final Rejection) dated Jun. 5, 2024 for U.S. Appl. No. 18/513,902 (pp. 1-16).
Office Action (Non-Final Rejection) dated Jun. 10, 2024 for U.S. Appl. No. 17/212,774 (pp. 1-15).
Office Action (Non-Final Rejection) dated Jun. 26, 2024 for U.S. Appl. No. 16/564,016 (pp. 1-15).
Office Action (Non-Final Rejection) dated Jul. 25, 2024 for U.S. Appl. No. 17/822,224 (pp. 1-16).
Office Action (Non-Final Rejection) dated Jul. 30, 2024 for U.S. Appl. No. 18/365,313 (pp. 1-7).
Office Action (Non-Final Rejection) dated Aug. 26, 2024 for U.S. Appl. No. 18/417,653 (pp. 1-13).
Office Action (Non-Final Rejection) dated Aug. 27, 2024 for U.S. Appl. No. 18/153,337 (pp. 1-6).
Office Action (Non-Final Rejection) dated Dec. 18, 2024 for U.S. Appl. No. 18/496,002 (pp. 1-5).
Office Action (Non-Final Rejection) dated Dec. 19, 2024 for U.S. Appl. No. 18/623,940 (pp. 1-7).
Office Action (Notice of Allowance and Fees Due (PTOL-85)) dated May 30, 2024 for U.S. Appl. No. 18/359,951 (pp. 1-7).
Office Action (Notice of Allowance and Fees Due (PTOL-85)) dated Jul. 22, 2024 for U.S. Appl. No. 17/835,411 (pp. 1-7).
Office Action (Notice of Allowance and Fees Due (PTOL-85)) dated Aug. 5, 2024 for U.S. Appl. No. 17/835,411 (pp. 1-2).
Office Action (Notice of Allowance and Fees Due (PTOL-85)) dated Aug. 28, 2024 for U.S. Appl. No. 18/365,313 (pp. 1-5).
Office Action (Notice of Allowance and Fees Due (PTOL-85)) dated Dec. 11, 2024 for U.S. Appl. No. 18/648,428 (pp. 1-8).
Polychronopoulos et al., Acoustic levitation with optimized reflective metamaterials, Scientific Reports (2020) 10:4254 (10 pages).
Supancic et al., "Depth-based hand pose estimation: data, methods, and challenges." In Proceedings of the IEEE international conference on computer vision, pp. 1868-1876. 2015. (Year: 2015).
Wang et al. (Translation and attitude synchronization for multiple rigid bodies using dual quaternions, Journal of the Franklin Institute 354 (2017) 3594-3616) (Year: 2017).
Wu et al. (Strapdown Inertial Navigation System Algorithms Based on Dual Quaternions,2009, IEEE, 2005, pp. 110-132) (Year: 2005).
Zhao et al., "Combining marker-based MOCAP and RGB-d camera for acquiring high-fidelity hand motion data." In Proceedings of the ACMSIGGRAPH/EurographicsSymposiumonComputer Animation. Eurographics Association, 33-42, 2012. (Year: 2012).
Notice of Allowance dated Jul. 31, 2019 for U.S. Appl. No. 15/851,214 (pp. 1-9).
Notice of Allowance dated Jul. 31, 2019 for U.S. Appl. No. 16/296,127 (pp. 1-9).
Notice of Allowance dated Jun. 10, 2021 for U.S. Appl. No. 17/092,333 (pp. 1-9).
Notice of Allowance dated Jun. 17, 2020 for U.S. Appl. No. 15/210,661 (pp. 1-9).
Notice of Allowance dated Jun. 25, 2021 for U.S. Appl. No. 15/396,851 (pp. 1-10).
Notice of Allowance dated May 30, 2019 for U.S. Appl. No. 15/966,213 (pp. 1-9).
Notice of Allowance dated Nov. 5, 2021 for U.S. Appl. No. 16/899,720 (pp. 1-9).
Notice of Allowance dated Oct. 1, 2020 for U.S. Appl. No. 15/897,804 (pp. 1-9).
Notice of Allowance dated Oct. 16, 2020 for U.S. Appl. No. 16/159,695 (pp. 1-7).
Notice of Allowance dated Oct. 30, 2020 for U.S. Appl. No. 15/839,184 (pp. 1-9).
Notice of Allowance dated Oct. 6, 2020 for U.S. Appl. No. 16/699,629 (pp. 1-8).
Notice of Allowance dated Sep. 30, 2020 for U.S. Appl. No. 16/401,148 (pp. 1-10).
Notice of Allowance in U.S. Appl. No. 15/210,661 dated Jun. 17, 2020 (22 pages).
Obrist et al., Emotions Mediated Through Mid-Air Haptics, CHI 2015, Apr. 18-23, 2015, Seoul, Republic of Korea. (10 pages).
Obrist et al., Talking about Tactile Experiences, CHI 2013, Apr. 27-May 2, 2013 (10 pages).
Office Action (Ex Parte Quayle Action) dated Jan. 6, 2023 for U.S. Appl. No. 17/195,795 (pp. 1-6).
Office Action (Final Rejection) dated Jan. 9, 2023 for U.S. Appl. No. 16/144,474 (pp. 1-16).
Office Action (Final Rejection) dated Mar. 14, 2022 for U.S. Appl. No. 16/564,016 (pp. 1-12).
Office Action (Final Rejection) dated Sep. 16, 2022 for U.S. Appl. No. 16/404,660 (pp. 1-6).
Office Action (Final Rejection) dated Nov. 18, 2022 for U.S. Appl. No. 16/228,767 (pp. 1-27).
Office Action (Final Rejection) dated Nov. 18, 2022 for U.S. Appl. No. 17/068,831 (pp. 1-9).
Office Action (Final Rejection) dated Dec. 8, 2022 for U.S. Appl. No. 16/229,091 (pp. 1-9).
Office Action (Final Rejection) dated Dec. 15, 2022 for U.S. Appl. No. 16/843,281 (pp. 1-25).
Office Action (Non-Final Rejection) dated Jan. 21, 2022 for U.S. Appl. No. 17/068,834 (pp. 1-12).
Office Action (Non-Final Rejection) dated Jan. 24, 2022 for U.S. Appl. No. 16/228,767 (pp. 1-22).
Office Action (Non-Final Rejection) dated Mar. 4, 2022 for U.S. Appl. No. 16/404,660 (pp. 1-5).
Office Action (Non-Final Rejection) dated Mar. 15, 2022 for U.S. Appl. No. 16/144,474 (pp. 1-13).
Office Action (Non-Final Rejection) dated Apr. 1, 2022 for U.S. Appl. No. 16/229,091 (pp. 1-10).
Office Action (Non-Final Rejection) dated May 2, 2022 for U.S. Appl. No. 17/068,831 (pp. 1-10).
Office Action (Non-Final Rejection) dated May 25, 2022 for U.S. Appl. No. 16/843,281 (pp. 1-28).
Office Action (Non-Final Rejection) dated Jun. 9, 2022 for U.S. Appl. No. 17/080,840 (pp. 1-9).
Office Action (Non-Final Rejection) dated Jun. 27, 2022 for U.S. Appl. No. 16/198,959 (pp. 1-17).
Office Action (Non-Final Rejection) dated Jun. 27, 2022 for U.S. Appl. No. 16/734,479 (pp. 1-13).
Office Action (Non-Final Rejection) dated Aug. 29, 2022 for U.S. Appl. No. 16/995,819 (pp. 1-6).
Office Action (Non-Final Rejection) dated Sep. 21, 2022 for U.S. Appl. No. 17/721,315 (pp. 1-10).
Office Action (Non-Final Rejection) dated Oct. 17, 2022 for U.S. Appl. No. 17/807,730 (pp. 1-8).

(56) References Cited

OTHER PUBLICATIONS

Office Action (Non-Final Rejection) dated Nov. 9, 2022 for U.S. Appl. No. 17/454,823 (pp. 1-16).
Office Action (Non-Final Rejection) dated Nov. 16, 2022 for U.S. Appl. No. 17/134,505 (pp. 1-7).
Office Action (Non-Final Rejection) dated Nov. 16, 2022 for U.S. Appl. No. 17/692,852 (pp. 1-4).
Office Action (Non-Final Rejection) dated Dec. 6, 2022 for U.S. Appl. No. 17/409,783 (pp. 1-7).
Office Action (Non-Final Rejection) dated Dec. 20, 2021 for U.S. Appl. No. 17/195,795 (pp. 1-7).
Office Action (Non-Final Rejection) dated Dec. 22, 2022 for U.S. Appl. No. 17/457,663 (pp. 1-20).
Office Action (Notice of Allowance and Fees Due (PTOL-85) dated Jan. 18, 2022 for U.S. Appl. No. 16/899,720 (pp. 1-2).
Office Action (Notice of Allowance and Fees Due (PTOL-85)) dated Feb. 11, 2022 for U.S. Appl. No. 16/228,760 (pp. 1-8).
Office Action (Notice of Allowance and Fees Due (PTOL-85)) dated Feb. 28, 2022 for U.S. Appl. No. 17/068,825 (pp. 1-7).
Office Action (Notice of Allowance and Fees Due (PTOL-85)) dated Mar. 7, 2022 for U.S. Appl. No. 16/600,496 (pp. 1-5).
Office Action (Notice of Allowance and Fees Due (PTOL-85)) dated Aug. 24, 2022 for U.S. Appl. No. 16/198,959 (pp. 1-6).
Office Action (Notice of Allowance and Fees Due (PTOL-85)) dated Aug. 31, 2022 for U.S. Appl. No. 16/198,959 (pp. 1-2).
Office Action (Notice of Allowance and Fees Due (PTOL-85)) dated Sep. 7, 2022 for U.S. Appl. No. 17/068,834 (pp. 1-8).
Office Action (Notice of Allowance and Fees Due (PTOL-85)) dated Sep. 8, 2022 for U.S. Appl. No. 17/176,899 (pp. 1-8).
Aksel Sveier et al.,Pose Estimation with Dual Quaternions and Iterative Closest Point, 2018 Annual American Control Conference (ACC) (8 pages).
JP Office Action for JP 2020-534355 (Dec. 6, 2022) (8 pages).
Ken Wada, Ring Buffer Basics (2013) 6 pages.
Notice of Allowance dated Feb. 23, 2023 for U.S. Appl. No. 18/060,556 (pp. 1-10).
Office Action (Final Rejection) dated Mar. 21, 2023 for U.S. Appl. No. 16/995,819 (pp. 1-7).
Office Action (Non-Final Rejection) dated Mar. 1, 2023 for U.S. Appl. No. 16/564,016 (pp. 1-10).
Office Action (Non-Final Rejection) dated Mar. 22, 2023 for U.S. Appl. No. 17/354,636 (pp. 1-5).
Office Action (Non-Final Rejection) dated Apr. 19, 2023 for U.S. Appl. No. 18/066,267 (pp. 1-11).
Office Action (Non-Final Rejection) dated Apr. 27, 2023 for U.S. Appl. No. 16/229,091 (pp. 1-5).
Office Action (Non-Final Rejection) dated May 8, 2023 for U.S. Appl. No. 18/065,603 (pp. 1-17).
Office Action (Non-Final Rejection) dated May 10, 2023 for U.S. Appl. No. 17/477,536 (pp. 1-13).
Office Action (Notice of Allowance and Fees Due (PTOL-85) dated Mar. 8, 2023 for U.S. Appl. No. 17/721,315 (pp. 1-8).
Office Action (Notice of Allowance and Fees Due (PTOL-85) dated Mar. 15, 2023 for U.S. Appl. No. 17/134,505 (pp. 1-5).
Office Action (Notice of Allowance and Fees Due (PTOL-85) dated Mar. 24, 2023 for U.S. Appl. No. 17/080,840 (pp. 1-8).
Office Action (Notice of Allowance and Fees Due (PTOL-85)) dated Apr. 4, 2023 for U.S. Appl. No. 17/409,783 (pp. 1-5).
Office Action (Notice of Allowance and Fees Due (PTOL-85)) dated Apr. 6, 2023 for U.S. Appl. No. 17/807,730 (pp. 1-7).
Office Action (Notice of Allowance and Fees Due (PTOL-85)) dated Apr. 28, 2023 for U.S. Appl. No. 17/195,795 (pp. 1-7).
Office Action (Notice of Allowance and Fees Due (PTOL-85) dated May 12, 2023 for U.S. Appl. No. 16/229,091 (pp. 1-8).
Office Action dated Feb. 9, 2023 for U.S. Appl. No. 18/060,556 (pp. 1-5).
Office Action dated Mar. 3, 2023 for U.S. Appl. No. 18/060,525 (pp. 1-12).
Office Action dated Apr. 19, 2023 for U.S. Appl. No. 18/066,267 (pp. 1-11).
Partial ISR for PCT/GB2023/050001 (Mar. 31, 2023) 13 pages.
Rakkolainen et al., A Survey of Mid-Air Ultrasound Haptics and Its Applications (IEEE Transactions on Haptics), vol. 14, No. 1, 2021, 18 pages.
Tomoo Kamakura, Acoustic streaming induced in focused Gaussian beams, J. Acoust. Soc. Am. 97 (5), Pt. 1, May 1995 p. 2740.
Uta Sailer, How Sensory and Affective Attributes Describe Touch Targeting C-Tactile Fibers, Experimental Psychology (2020), 67(4), 224-236.
Vincent Lepetit et al., Model Based Augmentation and Testing of an Annotated Hand Pose Dataset, ResearchGate, https://www.researchgate.net/publication/307910344, Sep. 2016, 13 pages.
Walter, S., Nieweglowski, K., Rebenklau, L., Wolter, K. J., Lamek, B., Schubert, F., . . . & Meyendorf, N. (May 2008). Manufacturing and electrical interconnection of piezoelectric 1-3 composite materials for phased array ultrasonic transducers. In 2008 31st International Spring Seminar on Electronics Technology (pp. 255-260).
Wang et al., Few-shot adaptive faster r-cnn. In Proceedings of the IEEE/CVF Conference on Computer Vision and Pattern Recognition, pp. 7173-7182. 2019. (Year: 2019).
Wang et al., Device-Free Gesture Tracking Using Acoustic Signals, ACM MobiCom '16, pp. 82-94 (13 pages).
Wilson et al., Perception of Ultrasonic Haptic Feedback on the Hand: Localisation and Apparent Motion, CHI 2014, Apr. 26-May 1, 2014, Toronto, Ontario, Canada. (10 pages).
Wooh et al., "Optimum beam steering of linear phased arays," Wave Motion 29 (1999) pp. 245-265, 21 pages.
Xin Cheng et al, "Computation of the acoustic radiation force on a sphere based on the 3-D FDTD method", Piezoelectricity, Acoustic Waves and Device Applications (SPAWDA), 2010 Symposium on, IEEE, (Dec. 10, 2010), ISBN 978-1-4244-9822-2, pp. 236-239.
Xu Hongyi et al., "6-DoF Haptic Rendering Using Continuous Collision Detection between Points and Signed Distance Fields", IEEE Transactions on Haptics, IEEE, USA, vol. 10, No. 2, ISSN 1939-1412, (Sep. 27, 2016), pp. 151-161, (Jun. 16, 2017).
Yang Ling et al., "Phase-coded approach for controllable generation of acoustical vortices", Journal of Applied Physics, American Institute of Physics, US, vol. 113, No. 15, ISSN 0021-8979, (Apr. 21, 2013), pp. 154904-154904.
Yarin Gal et al., Dropout as a Bayesian Approximation: Representing Model Uncertainty in Deep Learning, Oct. 4, 2016, pp. 1-12, Proceedings of the 33rd International Conference on Machine Learning, New York, NY, USA, 2016, JMLR: W&CP vol. 48.
Yaroslav Ganin et al., Domain-Adversarial Training of Neural Networks, Journal of Machine Learning Research 17 (2016) 1-35, submitted May 2015; published Apr. 2016.
Yaroslav Ganin et al., Unsupervised Domain Adaptataion by Backpropagation, Skolkovo Institute of Science and Technology (Skoltech), Moscow Region, Russia, Proceedings of the 32nd International Conference on Machine Learning, Lille, France, 2015, JMLR: W&CP vol. 37, copyright 2015 by the author(s), 11 pages.
Yoshino, K. and Shinoda, H. (2013), "Visio Acoustic Screen for Contactless Touch Interface with Tactile Sensation", University of Tokyo (5 pages).
Zeng, Wejun, "Microsoft Kinect Sensor and Its Effect," IEEE Multimedia, Apr.-Jun. 2012, 7 pages.
"Flexible piezoelectric transducer for ultrasonic inspection of non-planar components." Ultrasonics 48.5 (2008): 367-375.
Andre J. Duerinckx, Matched gaussian apodization of pulsed acoustic phased arrays, Ultrasonic Imaging, vol. 2, Issue 4, Oct. 1980, pp. 338-369.
Cappellari et al., "Identifying Electromyography Sensor Placement using Dense Neural Networks." In Data, pp. 130-141. 2018. ( Year: 2018).
EPO Examination Report for EP19769198.3 (Jul. 11, 2023) 9 pages.
Examination Report for EP 17 826 539.3 (Aug. 2, 2023) (5 pages).
First Examination report for ndian Patent Application No. 202247024128 (Aug. 11, 2023) (6 pages).
IL OA for IL 278402 (Nov. 29, 2023) 4 pages.
Inoue, A Pinchable Aerial Virtual Sphere by Acoustic Ultrasound Stationary Wave, IEEE (Year: 2014) 4 pages.
ISR and WO for PCT/GB2023/050001 (May 24, 2023) (20 pages).
ISR and WO for PCT/GB2023/052122 (Oct. 18, 2023) 13 pages.

(56) References Cited

OTHER PUBLICATIONS

ISR and WO for PCT/GB2023/052612 (Mar. 7, 2024) 18 pages.
Montenegro et al., "Neural Network as an Alternative to the Jacobian for Iterative Solution to Inverse Kinematics," 2018 Latin American Robotic Symposium, 2018 Brazilian Symposium on Robotics (SBR) and 2018 Workshop on Robotics in Education (WRE) João Pessoa, Brazil, 2018, pp. 333-338 (Year: 2018).
Nuttall, A. (Feb. 1981). Some windows with very good sidelobe behavior. IEEE Transactions on Acoustics, Speech, and Signal Processing. 8 pages.
Ochiai, Cross-Field Aerial Haptics: Rendering Haptic Feedback in Air with Light and Acoustic Fields, CHI (Year: 2016) 10 pages.
Office Action (Ex Parte Quayle Action) dated Jul. 20, 2023 for U.S. Appl. No. 16/843,281 (pp. 1-15).
Office Action (Ex Parte Quayle Action) dated Sep. 18, 2023 for U.S. Appl. No. 18/066,267 (pp. 1-6).
Office Action (Final Rejection) dated Jul. 25, 2023 for U.S. Appl. No. 17/454,823 (pp. 1-17).
Office Action (Final Rejection) dated Aug. 30, 2023 for U.S. Appl. No. 16/564,016 (pp. 1-15).
Office Action (Non-Final Rejection) dated Jan. 19, 2024 for U.S. Appl. No. 18/305,354 (pp. 1-4).
Office Action (Non-Final Rejection) dated Feb. 1, 2024 for U.S. Appl. No. 17/835,411 (pp. 1-7).
Office Action (Non-Final Rejection) dated Mar. 14, 2024 for U.S. Appl. No. 18/188,584 (pp. 1-5).
Office Action (Non-Final Rejection) dated Mar. 28, 2024 for U.S. Appl. No. 18/359,951 (pp. 1-5).
Office Action (Non-Final Rejection) dated Sep. 7, 2023 for U.S. Appl. No. 16/144,474 (pp. 1-16).
Office Action (Non-Final Rejection) dated Sep. 28, 2023 for U.S. Appl. No. 16/995,819 (pp. 1-8).
Office Action (Non-Final Rejection) dated Oct. 3, 2023 for U.S. Appl. No. 18/303,386 (pp. 1-18).
Office Action (Notice of Allowance and Fees Due (PTOL-85)) dated Jan. 31, 2024 for U.S. Appl. No. 18/352,981 (pp. 1-6).
Office Action (Notice of Allowance and Fees Due (PTOL-85)) dated May 24, 2023 for U.S. Appl. No. 16/229,091 (pp. 1-2).
Office Action (Notice of Allowance and Fees Due (PTOL-85)) dated Jun. 16, 2023 for U.S. Appl. No. 17/354,636 (pp. 1-7).
Office Action (Notice of Allowance and Fees Due (PTOL-85)) dated Jul. 20, 2023 for U.S. Appl. No. 17/692,852 (pp. 1-8).
Office Action (Notice of Allowance and Fees Due (PTOL-85)) dated Aug. 2, 2023 for U.S. Appl. No. 16/843,281 (pp. 1-5).
Office Action (Notice of Allowance and Fees Due (PTOL-85)) dated Aug. 8, 2023 for U.S. Appl. No. 17/645,305 (pp. 1-8).
Office Action (Notice of Allowance and Fees Due (PTOL-85)) dated Sep. 11, 2023 for U.S. Appl. No. 18/065,603 (pp. 1-11).
Office Action (Notice of Allowance and Fees Due (PTOL-85)) dated Oct. 12, 2023 for U.S. Appl. No. 18/066,267 (pp. 1-5).
Office Action (Notice of Allowance and Fees Due (PTOL-85)) dated Oct. 18, 2023 for U.S. Appl. No. 17/477,536 (pp. 1-8).
Oyama et al., "Inverse kinematics learning for robotic arms with fewer degrees of freedom by modular neural network systems," 2005 IEEE/RSJ International Conference on Intelligent Robots and Systems, Edmonton, Alta., 2005, pp. 1791-1798, doi: 10.1109/IROS.2005.1545084. (Year: 2005).
Papoulis, A. (1977). Signal Analysis. The University of Michigan: McGraw-Hill, pp. 92-93.
Prabhu, K. M. (2013). Window Functions and Their Applications in Signal Processing . CRC Press., pp. 87-127.
Schiefler, Generation and Analysis of Ultrasound Images Using Plane Wave and Sparse Arrays Techniques, Sensors (Year: 2018) 23 pages.
Smart Interface: Piezo Components with Flexible Printed Circuit Boards, www.physikinstrumente.co.uk/en/products/piezo-ceramic-components-transducers-for-oems/smart-interface/ (accessed Sep. 11, 2023) 5 pages.
Oscar Martinez-Graullera et al, "2D array design based on Fermat spiral for ultrasound imaging", Ultrasonics, (Feb. 1, 2010), vol. 50, No. 2, ISSN 0041-624X, pp. 280-289, XP055210119.
Partial International Search Report for Application No. PCT/GB2018/053735, date of mailing Apr. 12, 2019, 14 pages.
Partial ISR for Application No. PCT/GB2020/050013 dated May 19, 2020 (16 pages).
Patricio Rodrigues, E., Francisco de Oliveira, T., Yassunori Matuda, M., & Buiochi, F. (Sep. 2019). Design and Construction of a 2-D Phased Array Ultrasonic Transducer for Coupling in Water. In Inter-Noise and Noise-Con Congress and Conference Proceedings (vol. 259, No. 4, pp. 5720-5731). Institute of Noise Control Engineering.
PCT Partial International Search Report for Application No. PCT/GB2018/053404 date of mailing Feb. 25, 2019, 13 pages.
Péter Tamás Kovács et al, "Tangible Holographic 3D Objects with Virtual Touch", Interactive Tabletops & Surfaces, ACM, 2 Penn Plaza, Suite 701 New York NY 10121-0701 USA, (Nov. 15, 2015), ISBN 978-1-4503-3899-8, pp. 319-324.
Phys.org, Touchable Hologram Becomes Reality, Aug. 6, 2009, by Lisa Zyga (2 pages).
Pompei, F.J. (2002), "Sound from Ultrasound: The Parametric Array as an Audible Sound Source", Massachusetts Institute of Technology (132 pages).
Rocchesso et al., Accessing and Selecting Menu Items by In-Air Touch, ACM CHItaly'19, Sep. 23-25, 2019, Padova, Italy (9 pages).
Rochelle Ackerley, Human C-Tactile Afferents Are Tuned to the Temperature of a Skin-Stroking Caress, J. Neurosci., Feb. 19, 2014, 34(8):2879-2883.
Ryoko Takahashi, Tactile Stimulation by Repetitive Lateral Movement of Midair Ultrasound Focus, Journal of Atex Class Files, vol. 14, No. 8, Aug. 2015.
Schmidt, Ralph, "Multiple Emitter Location and Signal Parameter Estimation" IEEE Transactions of Antenna and Propagation, vol. AP-34, No. 3, Mar. 1986, pp. 276-280.
Sean Gustafson et al., "Imaginary Phone", Proceedings of the 24th Annual ACM Symposium on User Interface Software and Techology: Oct. 16-19, 2011, Santa Barbara, CA, USA, ACM, New York, NY, Oct. 16, 2011, pp. 283-292, XP058006125, DOI: 10.1145/2047196.2047233, ISBN: 978-1-4503-0716-1.
Search report and Written Opinion of ISA for PCT/GB2015/050417 dated Jul. 8, 2016 (20 pages).
Search report and Written Opinion of ISA for PCT/GB2015/050421 dated Jul. 8, 2016 (15 pages).
Search report and Written Opinion of ISA for PCT/GB2017/050012 dated Jun. 8, 2017. (18 pages).
Search Report by EPO for EP 17748466 dated Jan. 13, 2021 (16 pages).
Search Report for GB1308274.8 dated Nov. 11, 2013. (2 pages).
Search Report for GB1415923.0 dated Mar. 11, 2015. (1 page).
Search Report for PCT/GB/2017/053729 dated Mar. 15, 2018 (16 pages).
Search Report for PCT/GB/2017/053880 dated Mar. 21, 2018. (13 pages).
Search report for PCT/GB2014/051319 dated Dec. 8, 2014 (4 pages).
Search report for PCT/GB2015/052507 dated Mar. 11, 2020 (19 pages).
Search report for PCT/GB2015/052578 dated Oct. 26, 2015 (12 pages).
Search report for PCT/GB2015/052916 dated Feb. 26, 2020 (18 pages).
Search Report for PCT/GB2017/052332 dated Oct. 10, 2017 (12 pages).
Search report for PCT/GB2018/051061 dated Sep. 26, 2018 (17 pages).
Search report for PCT/US2018/028966 dated Jul. 13, 2018 (43 pages).
Seo et al., "Improved numerical inverse kinematics for human pose estimation," Opt. Eng. 50(3 037001 (Mar. 1, 2011) https:// doi.org/10.1117/1.3549255 (Year: 2011).

(56) References Cited

OTHER PUBLICATIONS

Sergey Ioffe et al., Batch Normalization: Accelerating Deep Network Training by Reducing Internal Covariat Shift, Mar. 2, 2015, pp. 1-11.
Seungryul, Pushing the Envelope for RGB-based Dense 3D Hand Pose Estimation for RGB-based Desne 3D Hand Pose Estimation via Neural Rendering, arXiv:1904.04196v2 [cs.CV] Apr. 9, 2019 (5 pages).
Shakeri, G., Williamson, J. H. and Brewster, S. (2018) May the Force Be with You: Ultrasound Haptic Feedback for Mid-Air Gesture Interaction in Cars. In: 10th International ACM Conference on Automotive User Interfaces and Interactive Vehicular Applications (AutomotiveUI 2018) (11 pages).
Shanxin Yuan et al., BigHand2.2M Bechmark: Hand Pose Dataset and State of the Art Analysis, Dec. 9, 2017, pp. 1-9.
Shome Subhra Das, Detectioin of Self Intersection in Synthetic Hand Pose Generators, 2017 Fifteenth IAPR International Conference on Machine Vision Applications (MVA), Nagoya University, Nagoya, Japan, May 8-12, 2017, pp. 354-357.
Sixth Sense webpage, http://www.pranavmistry.com/projects/sixthsense/ Accessed Nov. 30, 2018, 7 pages.
Stan Melax et al., Dynamics Based 3D Skeletal Hand Tracking, May 22, 2017, pp. 1-8.
Stanley J. Bolanowski, Hairy Skin: Psychophysical Channels and Their Physiological Substrates, Somatosensory and Motor Research, vol. 11. No. 3, 1994, pp. 279-290.
Stefan G. Lechner, Hairy Sensation, Physiology 28: 142-150, 2013.
Steve Guest et al., "Audiotactile interactions in roughness perception", Exp. Brain Res (2002) 146:161-171, DOI 10.1007/s00221-002-1164-z, /Accepted: May 16, 2002/Published online: Jul. 26, 2002, Springer-Verlag 2002, (11 pages).
Supplemental Notice of Allowability dated Jul. 28, 2021 for U.S. Appl. No. 16/563,608 (pp. 1-2).
Supplemental Notice of Allowability dated Jul. 28, 2021 for U.S. Appl. No. 17/092,333 (pp. 1-2).
Sylvia Gebhardt, Ultrasonic Transducer Arrays for Particle Manipulation (date unknown) (2 pages).
Takaaki Kamigaki, Noncontact Thermal and Vibrotactile Display Using Focused Airborne Ultrasound, EuroHaptics 2020, LNCS 12272, pp. 271-278, 2020.
Takahashi Dean: "Ultrahaptics shows off sense of touch in virtual reality", Dec. 10, 2016 (Dec. 10, 2016), XP055556416, Retrieved from the Internet: URL: https://venturebeat.com/2016/12/10/ultrahaptics-shows-off-sense-of-touch-in-virtual-reality/ [retrieved on Feb. 13, 2019] 4 pages.
Takahashi, M. et al., Large Aperture Airborne Ultrasound Tactile Display Using Distributed Array Units, SICE Annual Conference 2010 p. 359-62.
Takayuki et al., "Noncontact Tactile Display Based on Radiation Pressure of Airborne Ultrasound" IEEE Transactions on Haptics vol. 3, No. 3, p. 165 (2010).
Teixeira, et al., "A brief introduction to Microsoft's Kinect Sensor," Kinect, 26 pages, retrieved Nov. 2018.
Toby Sharp et al., Accurate, Robust, and Flexible Real-time Hand Tracking, CHI '15, Apr. 18-23, 2015, Seoul, Republic of Korea, ACM 978-1-4503-3145-6/15/04, pp. 1-10.
Tom Carter et al, "UltraHaptics: Multi-Point Mid-Air Haptic Feedback for Touch Surfaces", Proceedings of the 26th Annual ACM Symposium On User Interface Software and Technology, UIST '13, New York, New York, USA, (Jan. 1, 2013), ISBN 978-1-45-032268-3, pp. 505-514.
Tom Nelligan and Dan Kass, Intro to Ultrasonic Phased Array (date unknown) (8 pages).
EPO Office Action for EP16708440.9 dated Sep. 12, 2018 (7 pages).
EPSRC Grant summary EP/J004448/1 (2011) (1 page).
Eric Tzeng et al., Adversarial Discriminative Domain Adaptation, Feb. 17, 2017, pp. 1-10.
European Office Action for Application No. EP16750992.6, dated Oct. 2, 2019, 3 pages.
Ex Parte Quayle Action dated Dec. 28, 2018 for U.S. Appl. No. 15/966,213 (pp. 1-7).
Extended European Search Report for Application No. EP19169929.7, dated Aug. 6, 2019, 7 pages.
Freeman et al., Tactile Feedback for Above-Device Gesture Interfaces: Adding Touch to Touchless Interactions CMI'14, Nov. 12-16, 2014, Istanbul, Turkey (8 pages).
Gareth Young et al.. Designing Mid-Air Haptic Gesture Controlled User Interfaces for Cars, PACM on Human-Computer Interactions, Jun. 2020 (24 pages).
Gavrilov L R et al (2000) "A theoretical assessment of the relative performance of spherical phased arrays for ultrasound surgery" Ultrasonics, Ferroelectrics, and Frequency Control, IEEE Transactions on (vol. 47, Issue: 1), pp. 125-139.
Gavrilov, L.R. (2008) "The Possibility of Generating Focal Regions of Complex Configurations in Application to the Problems of Stimulation of Human Receptor Structures by Focused Ultrasound" Acoustical Physics, vol. 54, No. 2, pp. 269-278.
Georgiou et al., Haptic In-Vehicle Gesture Controls, Adjunct Proceedings of the 9th International ACM Conference on Automotive User Interfaces and Interactive Vehicular Applications (AutomotiveUI '17), Sep. 24-27, 2017 (6 pages).
GitHub—danfis/libccd: Library for collision detection between two convex shapes, Mar. 26, 2020, pp. 1-6.
GitHub—IntelRealSense/hand_tracking_samples: researc codebase for depth-based hand pose estimation using dynamics based tracking and CNNs, Mar. 26, 2020, 3 pages.
Gokturk, et al., "A Time-of-Flight Depth Sensor-System Description, Issues and Solutions," Published in: 2004 Conference on Computer Vision and Pattern Recognition Workshop, Date of Conference: Jun. 27-Jul. 2, 2004, 9 pages.
Guez, "Solution to the inverse kinematic problem in robotics by neural networks." In Proceedings of the 2nd International Conference on Neural Networks, 1988. San Diego, California. (Year: 1988) 8 pages.
Hasegawa, K. and Shinoda, H. (2013) "Aerial Display of Vibrotactile Sensation with High Spatial-Temporal Resolution using Large Aperture Airbourne Ultrasound Phased Array", University of Tokyo (6 pages).
Henneberg, J., Gerlach, A., Storck, H., Cebulla, H., & Marburg, S. (2018). Reducing mechanical cross-coupling in phased array transducers using stop band material as backing. Journal of Sound and Vibration, 424, 352-364.
Henrik Bruus, Acoustofluidics 2: Perturbation theory and ultrasound resonance modes, Lab Chip, 2012, 12, 20-28.
Hilleges et al. Interactions in the air: adding further depth to interactive tabletops, UIST '09: Proceedings of the 22nd annual ACM symposium on User interface software and technologyOct. 2009 pp. 139-148.
Hoshi et al., Tactile Presentation by Airborne Ultrasonic Oscillator Array, Proceedings of Robotics and Mechatronics Lecture 2009, Japan Society of Mechanical Engineers; May 24, 2009 (5 pages).
Hoshi T et al, "Noncontact Tactile Display Based on Radiation Pressure of Airborne Ultrasound", IEEE Transactions on Haptics, IEEE, USA, (Jul. 1, 2010), vol. 3, No. 3, ISSN 1939-1412, pp. 155-165.
Hoshi, T., Development of Aerial-Input and Aerial-Tactile-Feedback System, IEEE World Haptics Conference 2011, p. 569-573.
Hoshi, T., Handwriting Transmission System Using Noncontact Tactile Display, IEEE Haptics Symposium 2012 pp. 399-401.
Hoshi, T., Non-contact Tactile Sensation Synthesized by Ultrasound Transducers, Third Joint Euro haptics Conference and Symposium on Haptic Interfaces for Virtual Environment and Teleoperator Systems 2009 (5 pages).
Hoshi, T., Touchable Holography, SIGGRAPH 2009, New Orleans, Louisiana, Aug. 3-7, 2009. (1 page).
https://radiopaedia.org/articles/physical-principles-of-ultrasound-1?lang=GB (Accessed May 29, 2022).
Hua J, Qin H., Haptics-based dynamic implicit solid modeling, IEEE Trans Vis Comput Graph. Sep.-Oct. 2004;10 (5):574-86.

(56) References Cited

OTHER PUBLICATIONS

Hyunjae Gil, Whiskers: Exploring the Use of Ultrasonic Haptic Cues on the Face, CHI 2018, Apr. 21-26, 2018, Montréal, QC, Canada.
Iddan, et al., "3D Imaging in the Studio (And Elsewhwere . . . " Apr. 2001, 3DV systems Ltd., Yokneam, Isreal, www.3dvsystems.com.il, 9 pages.
Imaginary Phone: Learning Imaginary Interfaces by Transferring Spatial Memory From a Familiar Device Sean Gustafson, Christian Holz and Patrick Baudisch. UIST 2011. (10 pages).
IN 202047026493 Office Action dated Mar. 8, 2022, 6 pages.
India Morrison, The skin as a social organ, Exp Brain Res (2010) 204:305-314.
International Preliminary Report on Patentability and Written Opinion issued in corresponding PCT/US2017/035009, dated Dec. 4, 2018, 8 pages.
International Preliminary Report on Patentability for Application No. PCT/EP2017/069569 dated Feb. 5, 2019, 11 pages.
International Search Report and Written Opinion for App. No. PCT/GB2021/051590, dated Nov. 11, 2021, 20 pages.
International Search Report and Written Opinion for Application No. PCT/GB2018/053738, date of mailing Apr. 11, 2019, 14 pages.
International Search Report and Written Opinion for Application No. PCT/GB2018/053739, date of mailing Jun. 4, 2019, 16 pages.
International Search Report and Written Opinion for Application No. PCT/GB2019/050969, date of mailing Jun. 13, 2019, 15 pages.
International Search Report and Written Opinion for Application No. PCT/GB2019/051223, date of mailing Aug. 8, 2019, 15 pages.
International Search Report and Written Opinion for Application No. PCT/GB2019/052510, date of mailing Jan. 14, 2020, 25 pages.
Invitation to Pay Additional Fees for PCT/GB2022/051821 (Oct. 20, 2022), 15 pages.
ISR & WO for PCT/GB2020/052545 (Jan. 27, 2021) 14 pages.
ISR & WO for PCT/GB2021/052946, 15 pages.
ISR & WO for PCT/GB2022/051388 (Aug. 30, 2022) (15 pages).
ISR and WO for PCT/GB2020/050013 (Jul. 13, 2020) (20 pages).
ISR and WO for PCT/GB2020/050926 (Jun. 2, 2020) (16 pages).
ISR and WO for PCT/GB2020/052544 (Dec. 18, 2020) (14 pages).
ISR and WO for PCT/GB2020/052829 (Feb. 10, 2021) (15 pages).
ISR and WO for PCT/GB2021/052415 (Dec. 22, 2021) (16 pages).
ISR for PCT/GB2020/052546 (Feb. 23, 2021) (14 pages).

* cited by examiner

MID-AIR HAPTIC GENERATION ANALYTIC TECHNIQUES

PRIOR APPLICATIONS

This application claims the benefit of the following two applications, all of which are incorporated by references in their entirety (1) U.S. Provisional Patent Application No. 63/266,331, filed on Jan. 2, 2022; and (2) U.S. Provisional Patent Application No. 63/268,198, filed on Feb. 18, 2022.

FIELD OF THE DISCLOSURE

The present disclosure relates generally to improved techniques in producing and altering haptic effects from focused acoustic field.

BACKGROUND

A continuous distribution of sound energy, which will refer to as an "acoustic field", can be used for a range of applications including haptic feedback in mid-air, sound-from-ultrasound systems and producing encoded waves for tracking systems.

By defining one of more control points (or focus points) in space, the acoustic field can be controlled. Each point can be assigned a value equating to a desired amplitude at the control point. A physical set of transducers can then be controlled to create an acoustic field exhibiting the desired amplitude at the control points.

Mid-air ultrasonic haptic devices function by focusing ultrasonic energy to a point on the skin. This acoustic field induces two different forces: a dynamic force at the ultrasonic frequency, and a constant force from nonlinear acoustics. None of the mechanoreceptors in the human skin are capable of detecting either of these. The most sensitive mechanoreceptors are sensitive to vibratory stimulation of approximately 20-500 Hz. These are targeted by mid-air haptic devices through modulation of the acoustic field, either through varying amplitude (amplitude modulation, AM) or by tracing a repeating pattern (spatiotemporal modulation, STM).

The result of this is a disconnect between control of the ultrasonic array and haptic output. For example, if a device is to target a haptic on the palm of a user, directing a high-pressure point at a fixed location the palm is not enough—this will not produce a haptic effect. Instead, the host processor must use AM or translate the point in a repeating path to induce a haptic. To date, all mid-air haptic devices have been addressed by dictating point locations with the described disconnect between point location and haptics discussed above.

This disclosure proposes the use of a "haptic primitive" which is a fundamental unit of output which is more sophisticated than the simple high pressure point. One example of a haptic primitive is an AM point. Another example is an STM circle (a set of sequential points which draw a circle which is then repeated). Both of these generate a haptic sensation at the point they are directed. Using this concept, a haptic designer can direct a primitive to a location and deliver a haptic sensation at that location without needing to understand the subtleties of human mechanoreceptors. This primitive can then be translated or distorted to produce an infinite variety of haptic effects. This removes a level of complication between the desired haptic sensation and array output, enabling a broader class of users to program a mid-air haptic device successfully.

Further, by defining one of more control points in space, the acoustic field can be controlled. Each point can be assigned a value equating to a desired amplitude at the control point. A physical set of transducers can then be controlled to create an acoustic field exhibiting the desired amplitude at the control points. This is achieved by solving a complex-valued linear system, where a phased array system comprised of the physical set of transducers may be actuated using sinusoids defined by complex-valued excitations to generate the desired diffraction field that meets the required amplitudes at the locations of the control points.

SUMMARY

Mid-air ultrasonic haptic devices operate by manipulating an acoustic field to produce a haptic effect on a user. The primary method is to focus the acoustic energy to a compact point on a user's skin and modulating that energy at a frequency for which the human mechanoreceptors are most sensitive (typically 20-500 Hz). The modulation possibilities can be grouped into two broad categories: amplitude modulation (AM) and spatiotemporal modulation (STM). AM involves repeatedly attenuating the acoustic field at a sensitive frequency, which manifests as a small vibrating point to the user. STM involves translating a focus point along a repeated path, where the path is repeated at a skin-sensitive frequency. This manifests as a vibrotactile volume in the spatial locations of the path. AM and STM can also be combined to create a wide variety of haptic effects.

Creating a high-pressure point at a given location at a given amplitude is the fundamental problem confronted in designing a mid-air haptic system and enables mid-air haptic feedback. Today's devices expose that functionality to the haptic programmer and assumes enough competency with the complexity of human skin response to design a modulation scheme which produces a haptic effect. This assumption fundamentally limits mid-air haptic programmers to those willing to invest considerable effort into the endeavor.

The disclosure presented here proposes a fundamentally new way of addressing mid-air haptic devices which abstracts the most basic acoustic fundamental from that of a point to a "primitive" and then provides tools to adjust shape, location, and amplitude. A primitive can be designed to provide a haptic effect at the location targeted, removing the requirement of the designer needing to understand methods to create a haptic sensation—the primitive provides the haptic sensation and the designer only needs to worry about the 'where' and not the 'how'. In addition, this disclosure allows for a better distribution of computation between host and device. The mid-air haptic device can compute the points within a primitive instead of the host, allowing for the possibility of an imperfect connection between host and device without significant loss of haptic effect.

Further, a control scheme for a set of dynamic acoustic phased-array solvers is presented which enables a distributed system to compensate for unwanted time-of-flight artifacts at low cost. This is achieved by recursively subdividing the system into subtrees of phased-array nodes whose output can be estimated and the desired field drive distributed amongst the nodes. Timings of the desired field drive requests submitted to individual phased-array node inputs are then modified to compensate for the differences between wave coalescence/convergence and wave emission times, the time-of-flight, resulting in a more accurate acoustic field.

BRIEF DESCRIPTION OF THE DRAWINGS

The accompanying figures, where like reference numerals refer to identical or functionally similar elements throughout the separate views, together with the detailed description below, are incorporated in and form part of the specification, serve to further illustrate embodiments of concepts that include the claimed invention and explain various principles and advantages of those embodiments.

Figure 1:
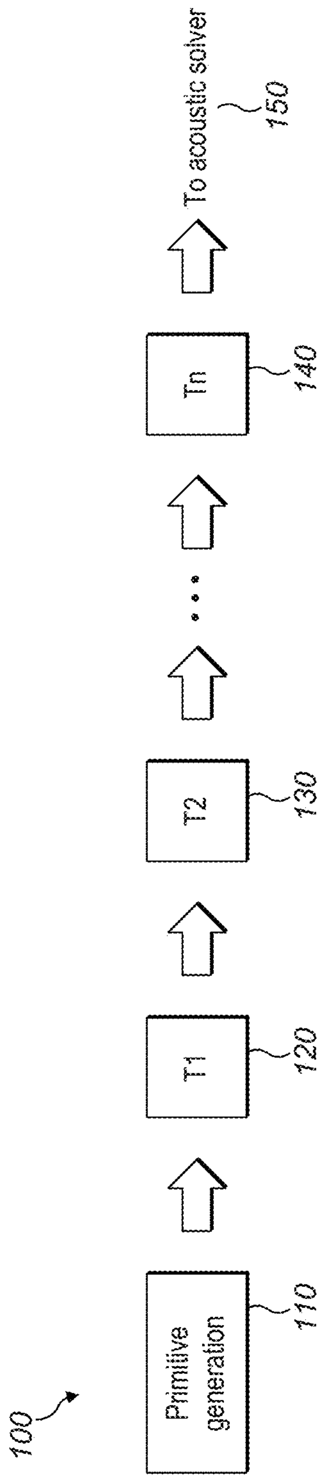
FIG. 1 shows a block diagram of the basic transform pipeline.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

I. Mid-Air Haptic Generation by Transformations on Primitives

A. Introduction

A primitive is defined as a series of coordinate locations with associated amplitude. The primitive output is followed by transforms (covered below) and finally is given to an acoustic solver to generate the specified field. For instance, an AM point primitive could consist of a single location at the origin with sinusoidal amplitude modulation at 100 Hz. An STM circle primitive could consist of a single point with unit amplitude offset from the origin by a given amount which, over time, precesses in a circle, repeating 100 times per second (100 Hz). In these examples, the "origin" is a construct which allows for transforms to distort the primitive in a controlled way before translating to the haptic user.

Mid-air haptic systems capable of generating complex fields with more than one high-pressure point could receive primitives which have more than one coordinate simultaneously. For instance, an STM circle consisting of two different points traveling along the same circle path, can create a different haptic feel than one point alone and could be a separate primitive. From the perspective of programming consistency, an ideal primitive generates a haptic effect on its own, but this is not strictly required by this invention.

One way of implementing a primitive is by using a mathematical function to generate points and amplitudes over time. For instance, an STM circle in the x-y plane could be generated by $$\vec{x}(t) = R * [\cos(\omega t), \sin(\omega t), 0],$$

where R is the radius of the circle, t is time, and ω is the STM angular frequency. The amplitude, which would need to be supplied in tandem, is a fixed value in this case. A particularly useful mathematical generator for STM curves is given by $$x(t) = A\cos(a\omega t + \delta)\cos(k\omega t),$$

$$y(t) = B\cos(b\omega t)\cos\left(k\left(\omega t + \frac{\pi}{2}\right)\right).$$

$$z(t) = 0.$$

where t is time and all other values are adjustable constants. Adjusting δ to zero and k to 1 for instance, results in a series of curves named Rose curves. Adjusting δ to π/2 and k to 0 similarly results in a class of curves named Lissajous curves. Other adjustments to the constants result in circles and lines. Generating the paths using trigonometric functions such as the above yield paths without sharp angles or large spacing between points which is known to create unwanted noise in mid-air haptic devices.

Primitives expressed as generating functions have the added benefit of being easily adjustable in real-time. If the primitive parameters are exposed to the programmer, this gives a sophisticated designer the ability to adjust the primitive in controlled, and often smooth, ways. It must be noted that the time variable here can be evaluated at arbitrary time or linked to discrete points, such as once per ultrasonic acoustic cycle.

After a primitive is selected a series of transforms are applied to modify the shape, size and location of the points being generated to create more sophisticated sensations.

In one embodiment of this invention, this takes place in the form of a series of cascaded affine transforms which are applied through a dot product with the coordinate vector. Affine transforms are implemented as a n×n matrix multiplication where n is one more than the dimension of the input coordinates. For instance, an affine transform on a 2-dimensional set of coordinates is a 3×3 matrix with the input coordinates padded with a 1 as their $3^{rd}$ coordinate before multiplication. Likewise, 3-dimensional coordinates use 4×4 element transformation matrices. Transformation matrices do not need to be square and can increase or decrease dimensionality if needed. Affine transformations are capable of but not limited to translation, reflection, scaling, rotation, shear, as well as simultaneous combinations of these.

As with primitive parameters, transforms can be implemented in the host or on the device. If implemented on the device, the host could modify exposed coefficients intermittently when things need to be changed, or on a regular basis. It must be noted that the primitive output coordinate system needs to be controlled in order for the transformations to be easily understood. For instance, a standard scaling transformation given by $$T = \begin{bmatrix} 2 & 0 & 0 \\ 0 & 1 & 0 \\ 0 & 0 & 1 \end{bmatrix},$$

which in this example would be interpreted as scaling the x-dimension by a factor of 2 while leaving the y-dimension alone. For this transform to operate as intended (scaling x symmetrically by 2), the primitive curve to be transformed by this needs to be centered at the origin. If, for example, a circle were centered at a coordinate other than zero, this transform would result in both a scaling but also a translation of the geometric center of the primitive. This could interfere with subsequent translation and targeting of the sensation. Therefore, for consistent functioning of transformations, a best practice of locating the geometric center of primitives at the origin should be practiced.

Primitives with more than one simultaneous point specified will need to have each point run through the transformation pipeline independently. One method to accomplish this is to represent each point as column in a location matrix and use the standard definition of dot product to apply each affine transform. In that case the output transformation will produce the transformed coordinates in their respective columns.

Acoustic solvers which take the output of this invention to generate acoustic fields can take as input both location and amplitude. More sophisticated solvers will attempt to achieve the desired parameters within the constraints of the transducers available. Amplitude information can take the form of simple acoustic pressure (measured in pascals), or can be more sophisticated if allowed by the solver. This includes, but is not limited to, squared pressure, acoustic intensity, particle velocity, particle velocity in a particular direction, nonlinear acoustic force, and nonlinear acoustic force in a particular direction. Amplitude information must be specified during the generation of the primitive. This amplitude can be modified post-primitive by scaling that is synched with or independent of transforms. Similar to the primitive generator, the amplitude could be represented as a mathematical function with adjustable variables. Scaling above the maximum output value can be managed through clipping, scaling, dynamic scaling, or other methods common to signal processing.

One particular primitive of note is one which contains points with a specified amplitude of zero. When a zero amplitude goal is given, a standard acoustic solver will attempt to formulate a field with zero (or very low) pressure at that location. A primitive which only contains points with zeros could therefore be seen as a "quiet" region in the field and placed in such a way as to shield potentially sensitive devices or animals. This quiet primitive can be transformed just as other primitives in order to track the sensitive device or animal. A primitive with zero or "null" points needn't have all its points specified at low pressure—a mix of zero and non-zero is also possible.

Turning to FIG. 1, shown is a block diagram 100 of the basic transform pipeline. After primitive generation 110 the output point proceeded through a series of transforms (T1 120, T2 130, . . . Tn 140) before being passed to an acoustic solver 150 which drives the mid-air haptic device.

Figure 2:
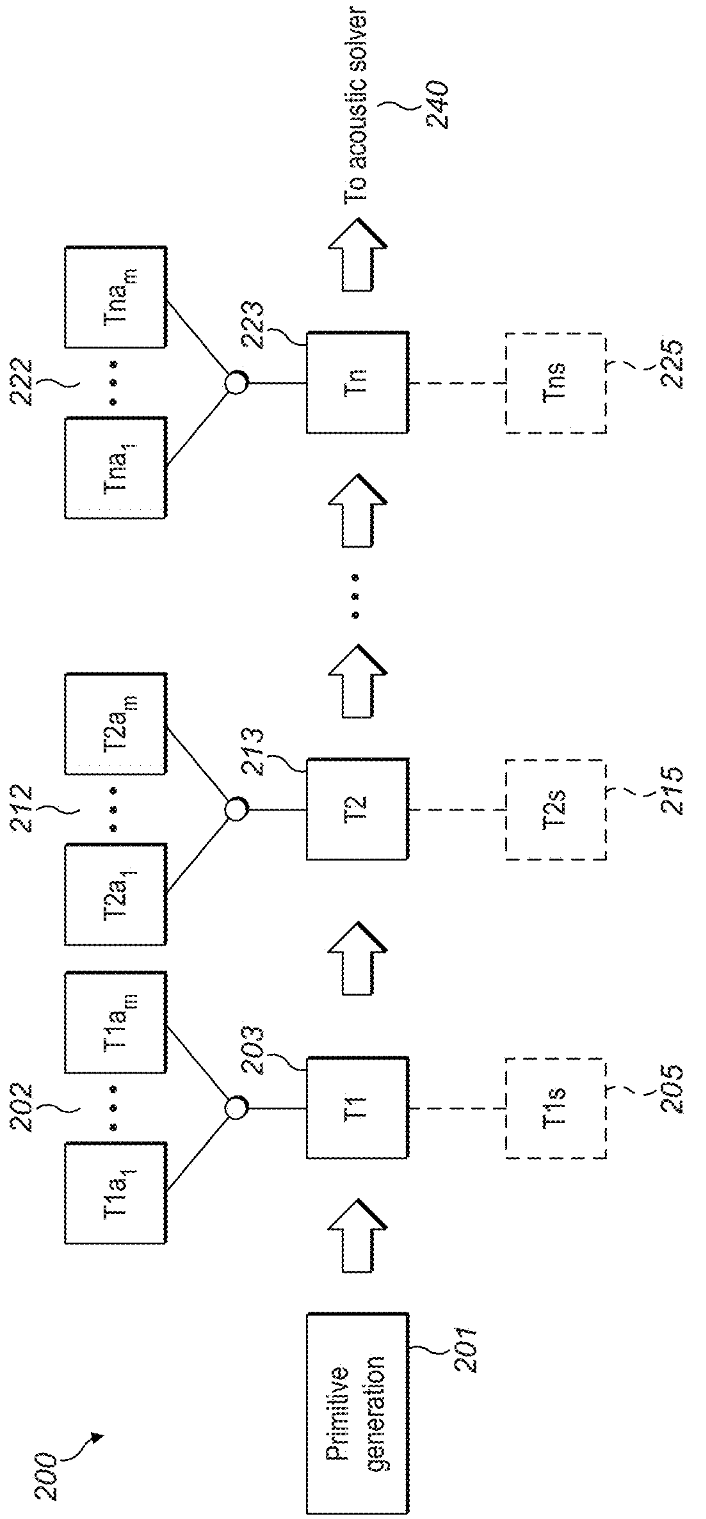
FIG. 2 shows a block diagram of the transformation pipeline including animation transforms.

Turning to FIG. 2, shown is a block diagram 200 of the transformation pipeline starting with primitive generation 201 including animation transforms ($T1a_1$ . . . $T1a_m$ 202 to T1 203; $T2a_1$ . . . T2 $a_m$ 212 to T2 213; . . . $Tna_1$ . . . $Tna_m$ 222 to Tn 223) and stored transforms (T1s 205, T2s 215, . . . Tns 225). Animation transforms are applied to their associated base transform at regular intervals dictated by logic not shown. At any point the base transform may be reset to a stored value in the stored transform before being sent to the acoustic solver 240.

The introduction of animation transforms in FIG. 2 provide additional examples. These transformations take the same form as the base transforms (T1 120, T2 130, . . . , Tn 140) but are applied to the base transformation repeatedly, at regular intervals. In one embodiment of this invention, these take the form of affine transforms. For example, if $T1a_1$ were active and designed to be applied after every update of the primitive, before T1 is applied to the output of the primitive generator, T1 203 is modified through the dot product of ($T1a_1 \cdot T1$) and the output stored into T1 203. This repeated application of the same transform can produce progressive animations such as steady rotation or translation. Multiple animation transforms can be associated with each transform slot. Each can be used independently, with logic designed to dictate when each should be applied—for example, run the first one for 1 second, then switch to the next animation transform, and so on.

Alternatively, multiple animation transforms could be cascaded with each evaluation, or some combination of both methods. This allows the system to independently apply transformations which change the output of the system without constant changes being dictated by the host. As an example, a line primitive can be made to rotate about its center by using a rotation transform in an animation transform slot. Upon each update interval, this animation transform applies a fixed rotation into the base transform, and since repeated applications are cumulative, the resulting base transform progressively rotates the output at a rate dictated by the animation transform and the frequency of animation application. Because the base transforms are continually modified, it is useful to provide storage for each transform to give the ability to return back to a known point. These are shown illustrated by T1s 205, T2s 215, and so on.

Transforms can be fixed, modified by some internal logic, or addressed externally. In the context of mid-air haptic feedback, it is useful to categorize one transform, usually at the end of the chain, as a "tracking transform". Transforms up to this point typically assume the geometric center of the primitive is located at the origin of the coordinate system. Using this best practice, values in the transforms can be more easily interpreted as scale, sheer, rotation, or other simple operations. But the haptic sensation at some point needs to be located on a user's hand or other body part which exists in a coordinate system separately provided by some kind of tracking device such as a camera, time of flight sensor or the like. Transforming from the internal device-coordinate-system to the tracking-coordinate-system can be accomplished in one or more base transforms. Producing this transform can be done via a host or internally to the array system with feedback from an external or internal tracker.

Generating points using methods presented in this invention which are fed to an acoustic solver which adjusts the output of a mid-air haptic device can occur at different levels in the control chain with different benefits. Traditionally, a mid-air haptic device expects point locations with desired amplitudes from a controller device, delivered in a timely manner. The controller device could take the form of a computer running a display or some other device integrated into user-tracking of some kind. It is possible to implement this invention on this host device which would address and operate the mid-air haptic device like before, with a stream of focus locations or more granular phases and amplitudes or similar information.

In another embodiment of this invention, the haptic device itself generates primitive coordinate locations and amplitudes and accepts from the host options to modify the primitive such as generating constants in a functional primitive as presented above and/or transform coefficients (both base and animation) as well as other logic to control timing and amplitude (not shown). In this arrangement, primitives and transforms can operate on the device, generating haptically effective acoustic field values independently while waiting for updates from a host. This improves the consistency of haptic effects as possible communication interruptions from the host will be largely invisible to the user experiencing the haptic effect.

In the legacy arrangement where points were streamed to the haptic device, missing updates for even a few milliseconds could result in uneven, noisy, or even completely absent haptic sensations. With primitives and transforms being generated on the devices, consistent output is maintained, even when the host is unresponsive.

Changing the primitives or transforms can be done from an external device (such as a host, as described above) or from within the mid-air haptic device. One method of organizing these changes is by means of a sequencer. This takes the form of a set of haptic parameters (primitive specification and transforms) which have a playback time and a pointer to another set of haptic parameters (with their own associated playback time). Upon activation, the system would produce the first set of parameters for the specified time period and then switch to the next as specified by the pointer. That next set of parameters would have its own playback time and pointer to another set. That pointer could point to a unique set of parameters or to one previously used.

In addition, any one set of parameters could also include logic to change parameters in other sets. For example, a group of 4 sets could proceed from 1 to 4 in order, but after getting to 4, that set changes pointers in 2 and 3 so that the order is reversed (3 points to 2 and 2 points to 1). Upon getting back to 1, that set returns the pointers to the original ordering sequence. This creates a sophisticated, repeating pattern without any direct changes necessary. During this playback, the tracking transform would be continuously modified as needed to maintain targeting of the haptic on the user. In this arrangement, a control (or host) device could modify primitives, transforms, pointers, or playback time found in any of the parameter sets, instead of directly modifying currently used transforms.

Switching between sets of parameters can be done immediately or over time via a smooth transition. Small changes, such as changing the translation speed in an animation transform, for instance, can be done immediately without unwanted noise. Some changes, however, such as switching between very different primitives, need to be smoothed to produce a better user experience.

In one embodiment, a transition period can be incorporated using interpolation or low-pass filtering. This can be implemented at the final point output before going into the acoustic solver or at various points in between base transforms. In this case, the x, y, z locations and amplitudes for each point would all be separately interpolated or low pass filtered for a certain period until the filtering or interpolating is deemed unnecessary. Another way to implement the transition is to interpolate or low-pass filter all primitive and transform values from one set of parameters to another.

In some implementations of this invention, more than one primitive with associated, independent transforms will need to be produced simultaneously. For example, a two-handed interaction needs separate haptics to be produced on each hand with each hand moving independently. As discussed above some acoustic solvers have the ability to produce complex pressure fields with more than one high-pressure point at the same time. For these systems, one solution is to maintain at least two independent primitive/transformation pipelines where the output of each is joined into a single request to the acoustic solver at regular intervals. This does have some drawbacks, however, as acoustic energy will be split among all of the desired high-pressure points in the system.

Another solution to produce multi-primitive sensations is to alternate between them. In systems with a multipoint acoustic solver, this can be achieved by only having the amplitude of one primitive on at any one time, with all others off. At a specified interval (for instance, after one complete primitive interval for a repeated path), the amplitude of one primitive cross-fades to another primitive, which is driven for a time before crossfading to another and eventually looping back to the first and repeating. This may reduce the total acoustic energy delivered to any one primitive but can increase the peak pressure for the time each primitive is being driven.

Another method to produce at least two primitives simultaneously is to alternate between them at regular intervals. In other words, produce one for a certain interval, and then switch to the other, then the next, and so on. While this will accomplish the desired sensations, large jumps between individual points (such as between primitives) can produce unwanted audible noise.

A solution to this is to include a set of transition points between each primitive. This transition will include an amplitude ramp towards zero during and/or immediately preceding the transition. New points, not part of any primitive, will then be fed to the acoustic solver which proceed from the last point produced by the previous primitive to the first desired point in the next one. The path for the transition can be a straight line path, or a more complex curve generated by smoothing methods such as filtering or polynomial curves. At or just preceding the arrival at the new primitive, amplitude can ramp back to the desired value. The intervening path to join multiple primitives together will be a compromise between speed and audibility. The faster the transition, the more audible noise will be produced, while the slower the transition, the less time will be spent drawing the haptics which is likely to reduce haptic feel. Ramps can be linear, polynomial, trigonometric, or other suitable curve. Depending on the headroom of acoustic energy available, creating multiple, simultaneous mid-air haptics can change the feel of an individual primitive and care must be taken to accommodate the possible change.

Figure 3:
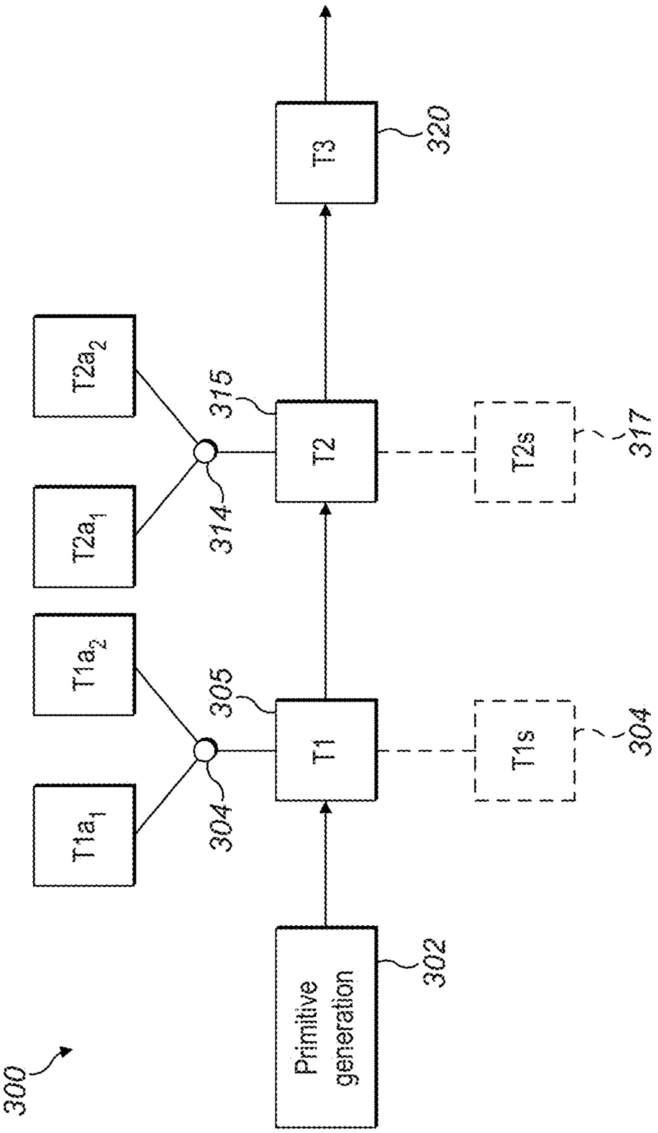
FIG. 3 shows a block diagram of the transformation pipeline including animation transforms having associated storage.

FIG. 3 shows a block diagram 300 of an example implementation of the invention. In this case, a primitive generation 302 interfaces with two independent base transforms (including up to 2 animation transforms $T1a_1$, $T1a_2$ 304 to T1 305 and $T2a_1$, $T2a_2$ 314 to T2 315, and storage T1s 304, T2s 317), which interfaces with T3 320. This is implemented as a tracking transforms to tilt and translate output points to a user's tracked palm.

Further, FIG. 3 shows an example implementation of this invention. In this case there are 3 base transforms with the first two having 2 animation transforms with associated storage. The third transform T3 320 is reserved as a tracking transform. In this arrangement, all transforms are implemented as 4×4 affine transformation matrices and the primitive generator outputs in 3 dimensions. This arrangement of transforms is capable of a wide variety of animated mid-air haptics with a minimum of computation.

Figure 4:
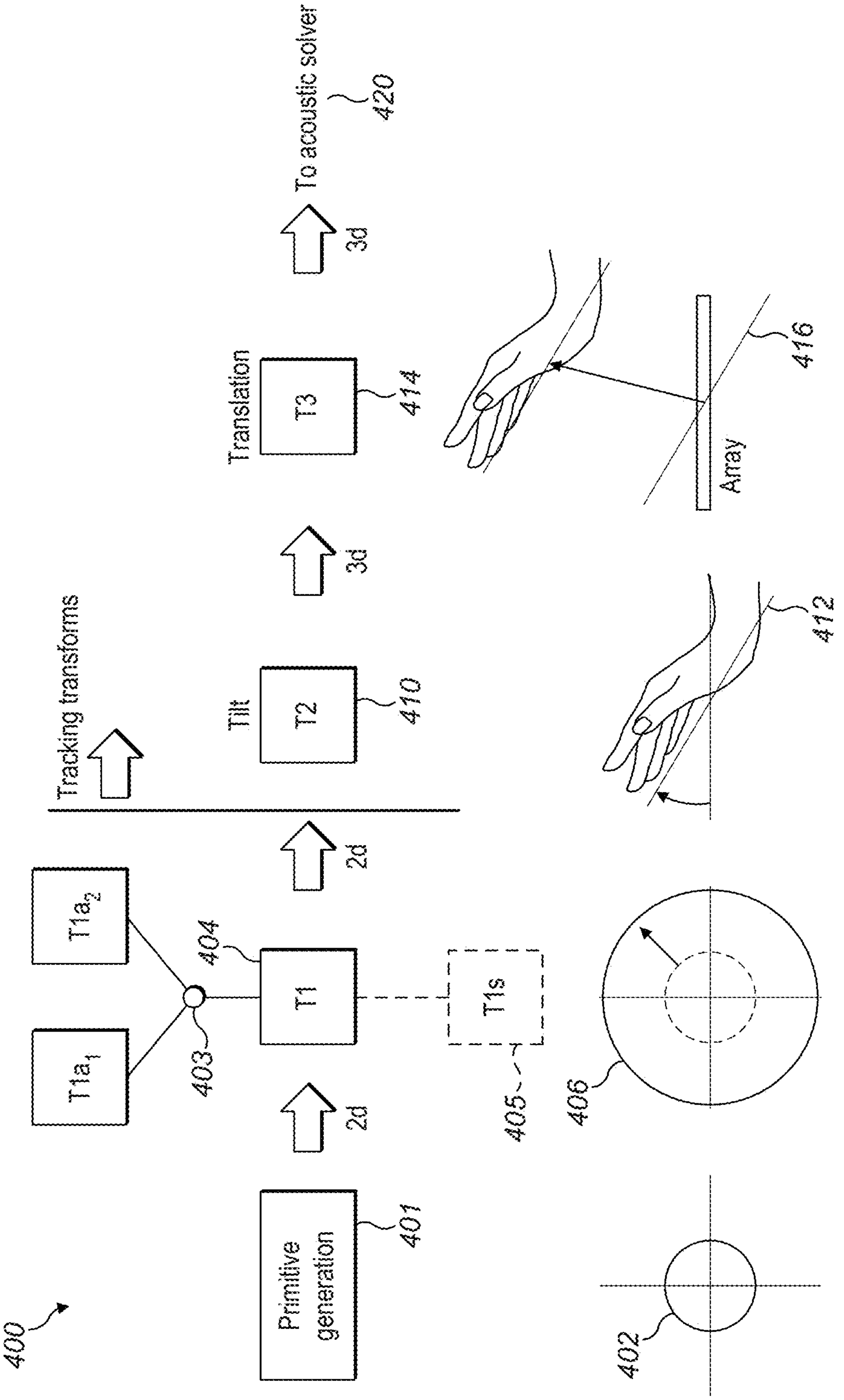
FIG. 4 shows a block diagram of the primitive generator that corresponds to the palm of a tracked user's hand.

FIG. 4 shows a block diagram 400 of an example implementation of the invention. In this case, the primitive generation 401 outputs only 2-dimensional points as shown in graph form 402. Output of the primitive generation is fed into a base transform with 2 associated animation transforms (including animation transform $T1a_1$, $T1a_2$ 403 to T1 404 and storage T1s 405) all still in 2 dimensions 406.

Tilt T2 410 is designed to take the 2D information and output a 3-dimensional set of points which matches the tilt of a tracked user's palm 412. T3 414 then translates the points onto the user's hand 416. The 3D points then interface to the acoustic solver 420.

Further, in this case the output of the primitive generator is 2-dimensional, simplifying the haptic design to a plane which corresponds to the palm of a tracked user's hand. The first base transform and its associated animation and storage transforms are all 3×3 affine transformation matrices, operating on 2-dimensional coordinates. More of these transformations can be cascaded if needed (not shown in the figure). The tilt transform (T2 410) takes the 2-dimensional information and adds a $3^{rd}$ coordinate through the following matrix multiplication:

$$u = norm(\hat{n} \times [0, 0, 1])$$

$$c = \hat{n}_z$$

$$s = sqrt\left(\hat{n}_x^2 + \hat{n}_y^2\right)$$

$$T = \begin{bmatrix} c + u_x^2(1-c) & u_x u_y(1-c) \\ u_x u_y(1-c) & c + u_y^2(1-c) \\ u_y s & -u_x s \end{bmatrix},$$

where n̂ is the normal of the tracked palm.

Depending on the definition of normal, a reversing of the normal may be required (multiplying n̂ by −1). After the tilt transform, a regular offset transform (T3 414) is applied to translate from array coordinates to tracking coordinates. This formulation of the invention reduces the amount of computation required for the initial cascade of base transforms, as they are only operating on 2 dimensions, rather than 3. It is possible to group the tilt and offset transform into one transform but is broken out into two in this case for readability.

The above description includes language where an "acoustic solver" drives a system to produce a desired acoustic field. This can take the form of a phased array of ultrasonic transducers where each transducer can be independently controlled. In this case the acoustic solver produces phase and amplitude parameters for driving each transducer. Other arrangements of an acoustic solver could include the ability to move a given transducer or groups of transducers. In this case the solver would produce phase, amplitude and location information. Regardless of actual implementation, this invention will be applicable to any mid-air haptic device which can flexibly produce acoustic fields with specified locations and associated amplitudes.

Figure 5:
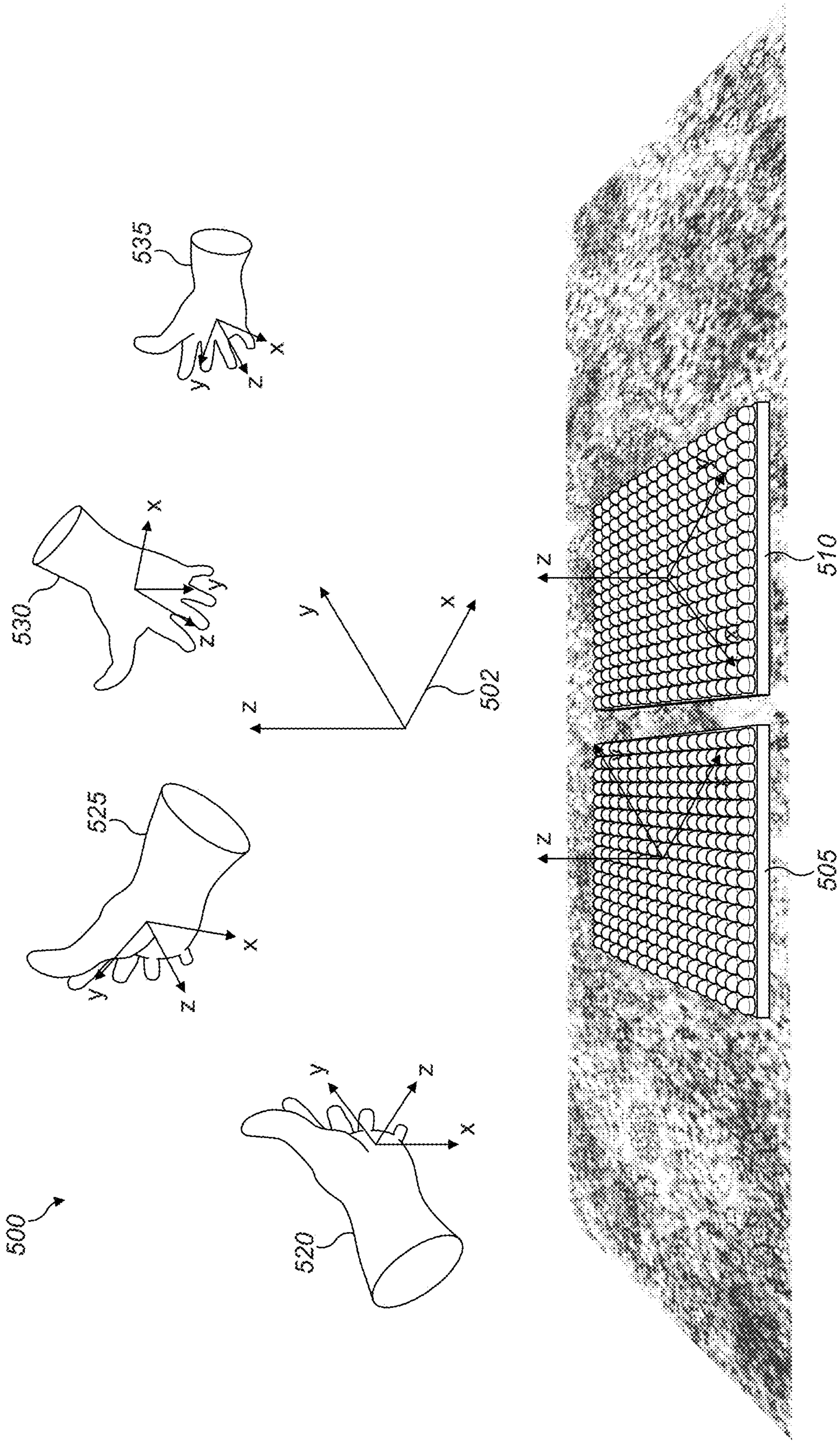
FIG. 5 shows four tracking reference frames, each pinned to the palm of the hand of a tracked hand.

Turning to FIG. 5, shown is an illustrative example 500 of four tracking reference frames 520 525 530 535, each in this example pinned to the palm of the hand of a tracked hand, a single global reference frame (center) 502 and two emitter reference frames 505, 510. A 'pin' transform transforms spatial haptic information from a local tracking reference frame into which the haptic effect is initially composited, into the global reference frame. An 'emitter' transform then transforms this spatial haptic information from a global reference frame to a local emitter reference frame in which its local processing is defined. This allows individual discrete devices to manage their own transducer locations, so the devices may be agnostic to their location in the global reference frame.

B. Transformations as Buffered States

Transformations applied to the control point data can be classified into three broad categories, that are applied in a specific order. First, as described, chains of composition transforms take points and other primitives and transform them to build local haptic effects. Second, pinning transforms change a local control point spatial frame of reference in which the effect is built into a global frame of reference.

Finally, emitter transforms change the global spatial frame of reference into a frame of reference with respect to the tile of transducers. These are applied in sequence to take a control point specified to a final control point for a system in control of a transducer array device to solve for. Equally, in some cases these may be omitted, for example if tracking is not necessary, or if a single system reference frame in which the transducer positions are defined is functionally equivalent to a global reference frame.

Each of these can be supplied as a data stream to the mid-air haptic device to realize a further light-weight approach to generating haptic effects. A number of streams of keyframed pinning transformations may be chosen between to allow different local reference frames to be transformed into the global frame. For example, each joint of each finger on the hand may be assigned a reference frame and control points may be moved to a reference frame by selecting that stream and thus pinning the control point to the reference frame selected. This allows for interactions for multiple hands, or multiple joints to be naturally created.

As tracking the user may be folded into the process of generating the pinning transformation stream, this can provide an abstract interface that can allow the process to consume transformations without regard for the origins of the data, so this allows for the use of any tracking system to provide source data. Equally, some compositional transforms may be merged with the tracking to generate a more primitive definition reference frame for the haptic effect, depending on the intent of the haptic designer.

C. Recycling Buffered States

Figure 6:
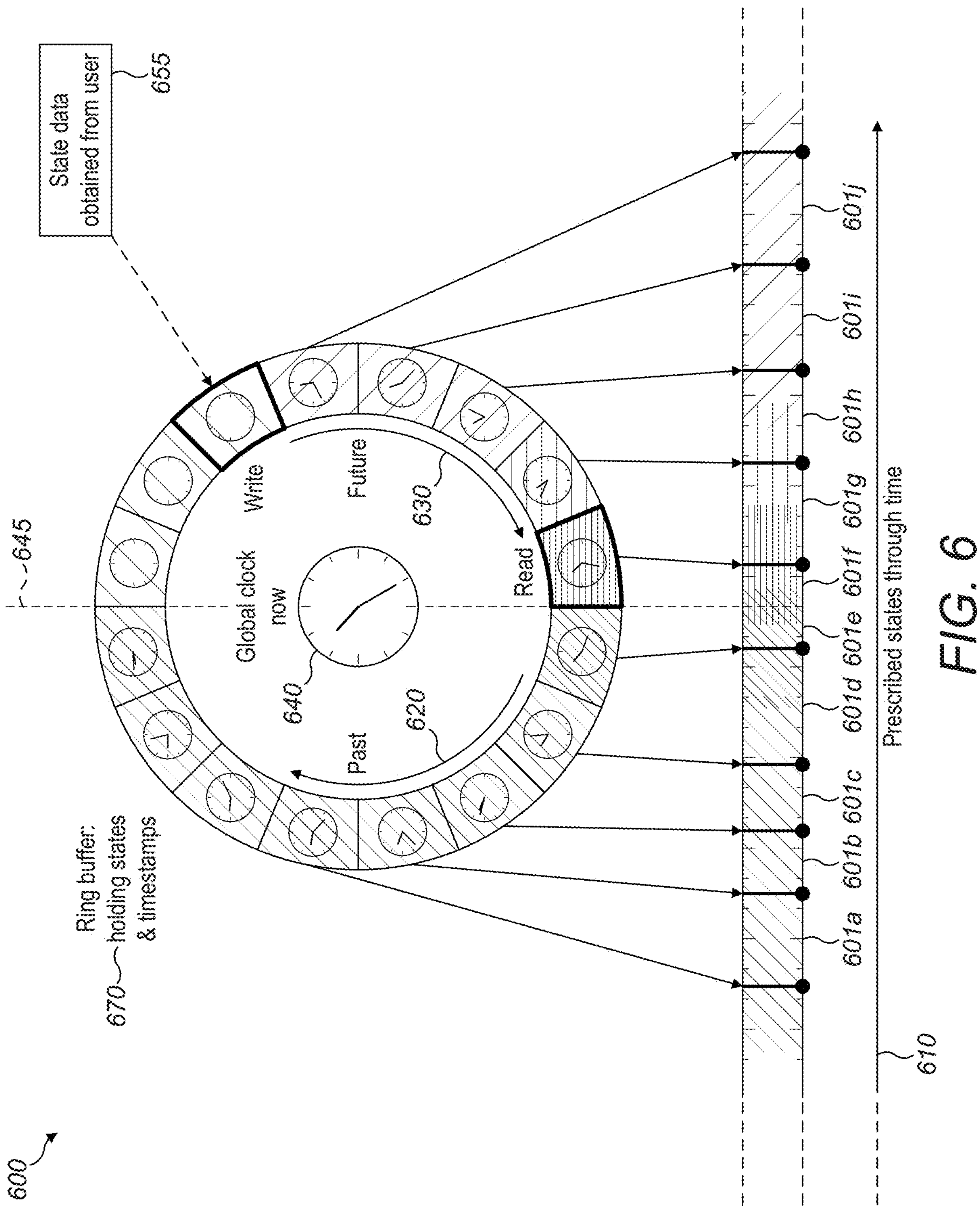
FIG. 6 shows a diagram illustrating states of the device moving through time that are constructed by interpolating together known states at known instants.
Figure 7:
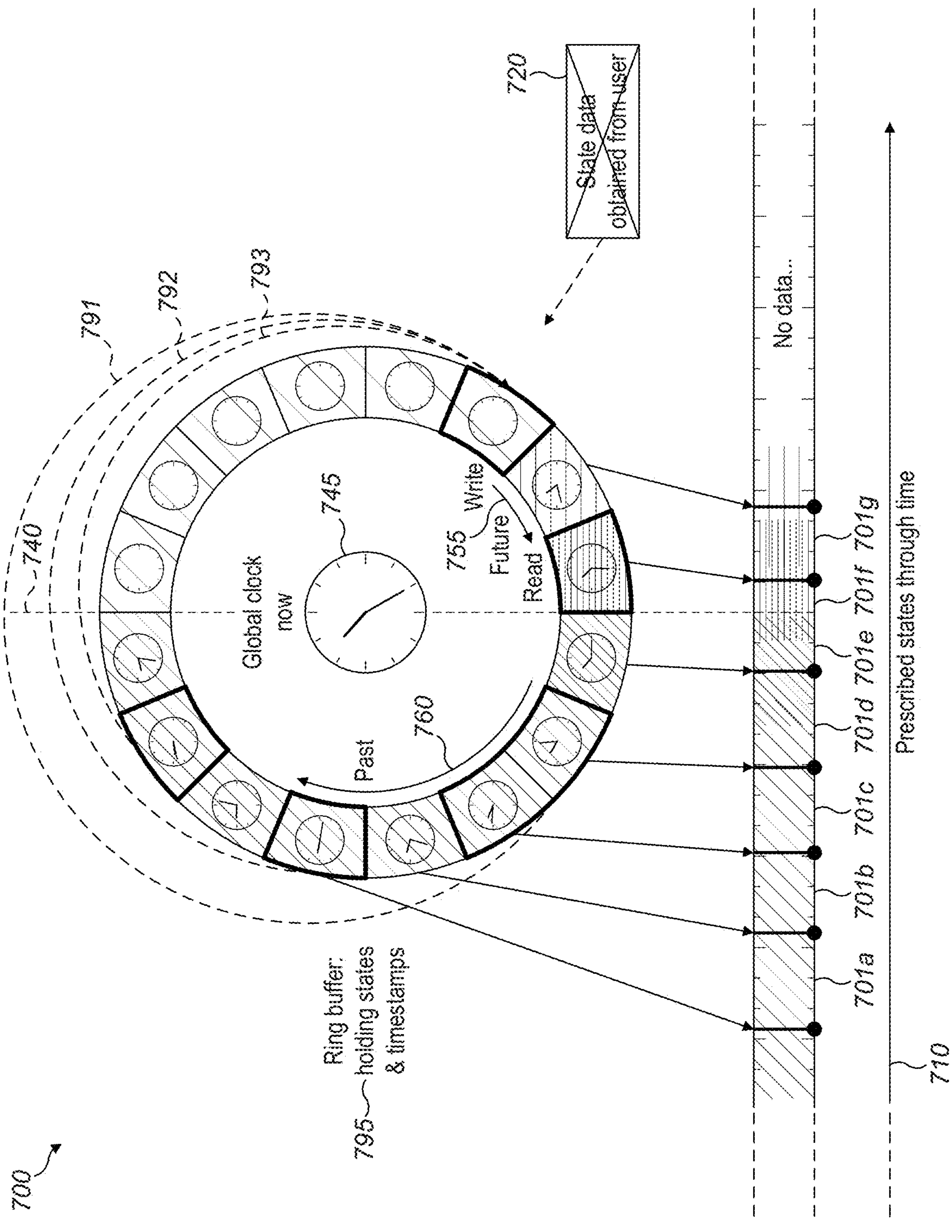
FIG. 7 shows a diagram similar to FIG. 6 when the user is not streaming data to the device and state date from the user is unavailable.

An alternate method for generating haptic effects may be realized by recycling buffered keyframes of the control points through time as shown in FIG. 7, as an alternate mode of device processing when a stream is not being supplied from an external source as in the ring buffer operations shown in FIG. 6.

Turning to FIG. 6, shown is a diagram 600 illustrating states of the device moving through time that are constructed by interpolating together known states at known instants or 'timepoints' 610. The clocks 640 and times are given for illustration purposes, as in a real implementation the queue shown would generally be consumed in a period many orders of magnitude shorter. This diagram 600 shows the structure of the ring buffer 670 for the queue and how this maps onto the behavior of the array or arrays along the timeline when the user is actively streaming data to the device. Future states marked as 'fresh' (leftward slashes and horizontal lines 601*g* 601*h* 601*i* 601*j*) are added incrementally to the ring buffer at the write index 630, incrementing it and defining the future behavior of the device.

When the read pointer reaches a state obtained from a user 655, as it is currently in the future, it is mixed with the previous state that is known to be in the past 620 (rightward slashes 601*a* 601*b* 601*c* 601*d*) to create the state that is to be used now (these two states are shown shaded 601*e* 601*f*, straddling the dashed 'now' line 645). This is achieved by interpolating the keyframes represented by the two states.

Turning to FIG. 7, shown is a diagram 700 shows the structure of the ring buffer 795 for the queue and how this maps onto the behavior of the array or arrays along the timeline 710 when the user is not streaming data to the device and state date from the user is unavailable 720. The clocks 745 and times are given for illustration purposes, as in a real implementation the queue shown would generally be consumed in a period many orders of magnitude shorter. Three states are shown shaded 701*e* 701*f*, 701*g* straddling the dashed 'now' line 740.

In this example, future states that can no longer be written to 755 (horizontal lines) are locked because there is not enough time to replace them before they are used. If the unlocked future states (leftward slashes in FIG. 6) are exhausted before fresh states are obtained from the user, instead of locking and thus using one of the stale states (wide rightward slashes that contain invalid data 701*a* 701*b* 701*c* 701*d*), policies will be used to copy data from past states 760 (narrow rightward slashes), often amalgamating timing information (shown as the two adjacent states 791) with other state data (shown as the other outlined states 792 793) to generate new state data that extrapolates into the future the desired behavior of the array. As such, the ring buffer structure 795 may be used to create simple repeating haptic effects that may be composited with data from other interfaces and/or buffers, where these other types of data may include spatial transformations that are applied later in the haptic effect render pipeline.

When the stream of externally supplied haptic effect primitive data (such as for example, control points or parametric haptic curves) is exhausted, policies describe how to recycle past data to generate repeating effects. This is realized by modifying the times associated with the control point states in the past while copying into the future section of the input buffer. In this way haptic effects comprising repeating cycles of the same control point data may be generated. Parallel queues of transformations that run alongside and modify these states through the application of the transformations can modify the haptic effects, so as to allow them to follow tracking data. Each control point may be generated from separate individual queues of states, or a combined queue—by singling out control points in this way, individual applications may apply bespoke repeating patterns as input to the mid-air haptic system. By recycling the control point states, but allowing the composition and pin or tracking transformations associated with them to change, different effects may be generated. Without loss of generality, recycling data in queues may be performed on queued transformation data with or without recycling control point data, providing palettes of effects such as for example running the two cycles of control point data and transformation data out of phase to produce a rose curve or Lissajous figure. Equally, a further example could be realized as small circles created with the control point data while allowing the transformation data to change to provide a brush that is moved by pinning the small circles to a transformation stream.

As the input queue is being fed by recycled data, further policies may be used to control how the haptic effect changes if an external haptic effect primitive data stream source is resumed. This may involve for example, blending the transform position or created minimum curvature paths so that the haptic effect of the recycling process may proceed smoothly into the haptic effect created by the resumed external stream.

Keyframe states of the haptic points as shown in FIGS. 6 and 7 may also have tangent information in order to construct Bezier and other types curves in the interval between the keyframes. Bezier curves are especially effective however, as by using the de Casteljau algorithm to generate Bezier curves by applying a recursive linear interpolation, a linear interpolation or other interpolation scheme that is already present may be reused to allow the number of keyframe states required to generate complex repeating haptic effects to be minimized.

While this particular approach has advantages for fixed-function hardware pipelines, the recycling of input buffers or queues of haptic effect primitive data may be implemented in any number of different ways, in both software and hardware systems, such as FPGAs or microcontrollers that contain sufficient buffering and queueing capabilities.

II. Distributed Time-Domain Phased-Array Solver for Applications in Ultrasonics

A. Introduction

As described earlier, the system may be split into many pieces which are responsible for local output on each local transducer array. Noting that for 'small' groups of transducer elements that are close in space and thus must be 'close' in time-of-flight, solving for the group does not incur noticeable time-of-flight artefacts or errors due to the locality of the group. Given this, solving independently for 'small' groups of transducer elements will each produce output that is largely free of time-of-flight error.

Therefore, splitting the system into many smaller solvers which are each responsible for a portion of the output is possible, but the independent nature of the groups is a problem. The inputs to each "solver" must be modified to enable the system to work as a whole, allowing these disparate units to cooperate on producing the acoustic field.

These are divided for the purposes of illustration into three categories, although the physical implementations of such devices may fall into more than one adjacent category.

Writing the problem definition in mathematics, $\alpha_q(\chi_j)$ may be used to describe a complex-valued scalar linear acoustic quantity $\alpha$ measured at a position offset from the transducer element q by the translation vector $\chi_j$, which may evaluate to be acoustic pressure or an acoustic particle velocity in a direction chosen for each j, the matrix A may be written:

$$A = \begin{bmatrix} \alpha_1(\chi_1) & \dots & \alpha_N(\chi_1) \\ \vdots & \ddots & \vdots \\ \alpha_1(\chi_m) & \dots & \alpha_N(\chi_m) \end{bmatrix},$$

As this is matrix A is not square, and the degrees of freedom number more than the constraints, this is termed a 'minimum norm' system. It is 'minimum norm' because as there are infinitely many solutions, the most expeditious solution is the one which achieve the correct answer using the least 'amount' of x—the solution x with minimum norm. To achieve this, some linear algebra is used to create a square system from the minimum norm system Ax=b:

$$A^H Ax = A^H b,$$

$$(A^H A)^{-1} A^H Ax = x = (A^H A)^{-1} A^H b,$$

This $A^H A$ is now N columns by N rows and given that the number of transducers is often very large this is an equivalently large matrix, and since any solution method must invert it, with it, this is not an efficient method. A more accessible approach is to create a substitution $A^H z=x$, before applying a similar methodology:

$$Cz = AA^H z = Ax = b,$$

$$z = C^{-1} b = (AA^H)^{-1} b,$$

This time around, as $C=AA^H$ is a mere m columns by m rows, this result is a much smaller set of linear equations to work through. The vector z can be converted into x at any time so long as $A^H$ can be produced.

This change of variables from the complex-valued vector that describes the drive of individual transducer elements x to the much lower dimensional z has further meaning. Each complex-valued component of z can be viewed as a complex-valued drive coefficient that pre-multiplies a focusing function which generates a focus from all of the individual transducer fields, wherein the focal point is co-located with each individual control point. For m control points therefore, there are m such focussing functions or 'basis sets'; they can be viewed as defining a complex vector space $\mathbb{C}^m$ where points in this space correspond to possible configurations of these m 'focus points'.

To account for the possibility that the optimal minimum norm solution is not used to form the C matrix, then this may be expressed via an extra weighting for each transducer and control point as $\sigma_{r,q}$, with r representing the control point index and q representing the transducer index (which may be set to unity in the case that no weighting is desired, otherwise some transducers will be used preferentially in the creation of the control points resulting in deviation from the minimum norm condition)—this can be viewed as reweighting the final x vector used as the excitation vector for the transducer elements by substituting $B^H z=x$, where:

$$B = \sigma \times A = \begin{bmatrix} \sigma_{1,1}\alpha_1(\chi_1) & \dots & \sigma_{1,N}\alpha_N(\chi_1) \\ \vdots & \ddots & \vdots \\ \sigma_{m,1}\alpha_1(\chi_m) & \dots & \sigma_{m,N}\alpha_N(\chi_m) \end{bmatrix},$$

and x here denotes component-wise multiplication. Defining the set of $\alpha_c=[\alpha_1(\chi_c), \dots, \alpha_q(\chi_c), \dots, \alpha_N(\chi_c)]$, and $\beta_c=[\sigma_{c,1}\alpha_1(\chi_c), \dots, \sigma_{c,q}\alpha_q(\chi_c), \dots, \sigma_{c,N}\alpha_N(\chi_c)]$, this adjusted C matrix may be expressed as:

$$C = \begin{bmatrix} \alpha_1 \cdot \overline{\beta_1} & \dots & \alpha_1 \cdot \overline{\beta_r} & \dots & \alpha_1 \cdot \overline{\beta_m} \\ \vdots & \ddots & \vdots & \iddots & \vdots \\ \alpha_r \cdot \overline{\beta_1} & \dots & \alpha_r \cdot \overline{\beta_r} & \dots & \alpha_r \cdot \overline{\beta_m} \\ \vdots & \iddots & \vdots & \ddots & \vdots \\ \alpha_m \cdot \overline{\beta_1} & \dots & \alpha_m \cdot \overline{\beta_r} & \dots & \alpha_m \cdot \overline{\beta_m} \end{bmatrix},$$

but the dot products for each element may be written as the summation where for instance $$\alpha_\alpha \cdot \overline{\boldsymbol{\beta}_{\ell}} = \sum_{q=1}^{N} \alpha_q(\chi_\alpha)\overline{\sigma_{\ell,q}\alpha_q(\chi_\ell)}$$

If there are multiple devices that have access to disjoint sets of transducer elements, so if there exist M devices such that the global transducer set may be numbered $q \in \{1, \dots, N_1, N_1+1, \dots, N_2, \dots, N_M=N\}$, where device 1 drives transducers $1, \dots, N_1$, device 2 drives transducers $N_1+1, \dots, N_2$ and device M−1 drives transducers $N_{M-1}+1, \dots, N$, then each dot product in the matrix C may be written:

$$\beta_a \cdot \overline{\boldsymbol{\alpha}_{\ell}} = \left(\sum_{q=1}^{N_1} \alpha_q(\chi_a)\sigma_{a,q}\overline{\alpha_q(\boldsymbol{\chi}_{\ell})}\right) + \dots + \left(\sum_{q=N_{M-1}+1}^{N} \alpha_q(\chi_a)\sigma_{a,q}\overline{\alpha_q(\boldsymbol{\chi}_{\ell})}\right).$$

This implies that the C matrix itself may be written in a per-transducer element form as:

$$C_{tx,q} = \begin{bmatrix} \alpha_q(\chi_1)\sigma_{1,q}\overline{\alpha_q(\chi_1)} & \dots & \alpha_q(\chi_1)\sigma_{1,q}\overline{\alpha_q(\chi_r)} & \dots & \alpha_q(\chi_1)\sigma_{1,q}\overline{\alpha_q(\chi_m)} \\ \vdots & \ddots & \vdots & \iddots & \vdots \\ \alpha_q(\chi_r)\sigma_{r,q}\overline{\alpha_q(\chi_1)} & \dots & \alpha_q(\chi_r)\sigma_{r,q}\overline{\alpha_q(\chi_r)} & \dots & \alpha_q(\chi_r)\sigma_{r,q}\overline{\alpha_q(\chi_m)} \\ \vdots & \iddots & \vdots & \ddots & \vdots \\ \alpha_q(\chi_m)\sigma_{m,q}\overline{\alpha_q(\chi_1)} & \dots & \alpha_q(\chi_m)\sigma_{m,q}\overline{\alpha_q(\chi_r)} & \dots & \alpha_q(\chi_m)\sigma_{m,q}\overline{\alpha_q(\chi_m)} \end{bmatrix},$$

yielding:

$$C = \sum_{q=1}^{N} C_{tx,q} = \left(\sum_{q=1}^{N_1} C_{tx,q}\right) + \dots + \left(\sum_{q=N_{M-1}+1}^{N} C_{tx,q}\right).$$

This implies that the C matrices for individual transducers may be collected together by a recursive or hierarchical process that exploits sum-reduction operators to construct successively more complete representations of a distributed system of transducers, to be solved in a central location (or the computation repeated in distributed locations for better fault tolerance). However, as the matrix B is required to take the z vector produced and reconstruct the transducer excitations, it is also necessary to express B as a disjoint set of matrices, where the B matrix for a given transducer q may be written:

$$B_{tx,q} = \begin{bmatrix} \sigma_{1,q}\alpha_q(\chi_1) \\ \vdots \\ \sigma_{m,q}\alpha_q(\chi_m) \end{bmatrix},$$

so the element of the excitation vector corresponding to transducer element q is written:

$$B_{tx,q}z = x_q.$$

Therefore, since each portion of the x vector may be stored locally as it is only necessarily required to drive the transducer elements, no information regarding individual transducer elements or their weightings needs to be communicated globally to obtain the transducer excitations—only the C matrix for each subset of the system is required to be communicated.

The subsets of the C matrix may be generated locally to the transducer array in a functional unit which will be labelled a "tile". The "central location" described will be labelled a "solver". These "tiles" would then each generate a subset of the C matrix and communicate it to the "solver", where the matrix would be solved to produce the z vector which is communicated back to the "tiles" and expanded into the x vector which informs how the transducers are driven.

Incarnations of the A matrix may also be constructed to generate linear acoustic quantities, such as the acoustic pressure or the particle velocity of the acoustic medium in a known direction. As these are linear quantities, they may be calculated by applying disjoint portions of the A matrix and transmitting only the computed quantities. Then via a similar sum-reduction process to that required to compute the C matrix for the system, any given acoustic quantity may be calculated from synchronised application of portions of x vectors, as any linear quantity α may be found as:

$$A_{tx,q} = \begin{bmatrix} \alpha_q(\chi_1) \\ \vdots \\ \alpha_q(\chi_m) \end{bmatrix},$$

$$\acute{\alpha}_{\Omega,q} = A_{tx,q}x_q,$$

where $\acute{\alpha}_{\Omega,q}$ is the contribution of the transducer q to the final simulated linear acoustic quantity field. This is useful to give an added layer of control and certainty to the system to allow the controlling device to accurately gauge the capabilities and constraints of the platform or platforms with which it may be communicating.

However, this has the significant limitation that it does not account for the time-of-flight, as to realize the field, the transducers must be driven with the amplitude and phase given by the solution for all time, as the complex valued transducer field functions are valid only for a single frequency field and an exact single frequency implies an infinite spread in time.

The reason why a phased array of transducers must be actuated for all time to achieve this is that the speed of sound causes any change in the transducer output to lag behind the creation of a control point in the field by the travel time of the acoustic wave. As a result, as the size of transducer array or separation of elements increases, causing greater differences in time-of-flight, errors accumulate in the created field.

A way to compensate for this is by offsetting the time of the control point so that the wave travel time is accounted for—by emitting the appropriate amplitude and phase of the wave from each transducer at a time corresponding to the time of flight subtracted from the convergence time of the point. However, as each transducer is a different distance from the point, each must contribute to any given control point in a fixed space and time at different times, their states cannot be solved for simultaneously. The trajectory of the control points must be intersected with the time evolution of the wave from the transducer, where each transducer contributes to each point along the timeline at a different time offset, but then to achieve given control point amplitudes at points in time, many transducers from different times must be controlled through time.

These issues result in having to extend each matrix to solve for the drive to all transducers at all times to create all control points at all times. This implies a very large matrix formulation that cannot be solved satisfactorily.

One way to approximate this is by considering which elements of this large matrix dominate and constructing a solution matrix at each point in time for only these elements. This can be considered as finding points on the control point trajectory with the maximum possible deposited output energy with emission from the actuated transducer at the current time step and adding only the rows and columns corresponding to these after having split up the output along the control point trajectory using a heuristic. Then, basis sets of transducers that are to actuate the control points along the trajectory are built with a temporal envelope function, so the further away in time the wave generated from the transducer activation is, the less the given transducer can contribute. This is described in more detail in a prior patent application.

This approach has some drawbacks. Having to manage and query the acoustic output data associated with the control point trajectory through time involves large data structures, which contribute to the cost and engineering complexity of the solution. Further, the total power is limited as only large groups of similar time-of-flight transducer elements are considered at each time step. Transducers with poorly matching time-of-flight are forced to contribute at greatly reduced power due to the temporal envelope function, reducing efficiency. While the temporal envelope function can be modified to provide a trade-off between high-efficiency and temporal accuracy, with this approach both cannot be achieved simultaneously. Given the high cost of transducers and high complexity of this approach, the implementation is hard to justify.

In this disclosure, a simple method using hierarchical subdivision to produce a distributed system will be described.

At the top level there is a "manager", responsible for managing the data flow and demands from the user, optionally applying user-specified transformations and collating global data on the state of the produced and producible acoustic field.

Although there is notionally one single "manager", some embodiments may use a "multihead" strategy where the same global data is accumulated in multiple locations for redundancy or other reasons. This device has notionally one or more children which is each a potential subtree or notional subgraph of "solver" elements.

The "solver" elements each represent a single "timezone" wherein larger than wavelength time-of-flight adjustments between transducer pairs that cannot be made used phased array control techniques are deemed to be unnecessary, so each of these and its controlling units are considered to be a single phased array system. It solves the control point problem to obtain coefficients using data gathered from its children's subtrees and adjusts timings on the input to ensure that the time-of-flight from some indicative central location for the timezone is accounted for. This device has notionally one or more children which is each a potential subtree or notional subgraph of "tile" elements.

The "tile" elements each have models for the collection of transducers under their control and can use these models to determine the coefficients of the transducers to estimate relative levels of acoustic quantities, determine entries for the local contribution to the control point relations matrix or C matrix and expand the solution vector coefficients back into coefficients for transducer drives. Each of these is either directly connected to the transducers or otherwise controls a set of transducers which may be instructed in time to emit an ultrasonic wave at the same frequency with a given amplitude and phase offset, although clearly changing this amplitude and phase offset in time yields frequency shifting output.

Firstly, the useful output that can be obtained from the marshalling of the transducer resources controlled by each "solver" unit must be estimated in order to determine how to split the generation of the acoustic field amongst them. Then each group, while having its available transducers close in space and thus close in time, has a single but different time-of-flight to each control point in the acoustic field. As a result, the control points upon input to each "solver", in order to be expressed in the interference pattern at the correct time and also synchronized between all "solver" units, can be moved in time from the convergence time expressed by the user to an appropriate emission time by subtracting a time-of-flight indicative of the distance of the subset of transducer elements available to it. This may be a distance from some indicative central location of the subset of transducers, this may be a minimum distance from any single member transducer, it may be computed from a global-to-solver-local transformation or using another heuristic. Consequently, the complex-valued drives for the subset of transducers addressed by the solver may be solved by using the standard phased array paradigm on the control points having been modified in time in this way.

However, as each of the control points change in relative emission time between solving units, it is impossible to know ahead of time which control points will be sharing the resource on each emission time step. In this case, since only the proportional splitting of the problem need be conducted between solving units, estimation may be conducted independently of other control points by computing the diagonal of the C matrix, that is:

$$\alpha_{\propto,natural,r} := \alpha_r \cdot \overline{\beta_r},$$

which estimates what proportion of the linear acoustic quantity can be produced by a unit drive of the available transducers with a fully focusing phase angle. As a result, this is an effective predictor of the relative proportion of the output linear acoustic quantity that can be brought to bear that is comparable between solving units.

To realize this extra functionality which involves multiple "solver" functional units, an extra level in the hierarchy must be introduced, the "manager". While this is for simplicity described as a single unit, duplicating the necessary data would enable decentralized approaches to function with equal effectiveness.

A directed acyclic graph (DAG) may then be generated, which for simplicity may also double as communication links between nodes. In the example configuration, a single "manager" node connects to one or more subtrees of "solver" nodes, which then connects to one or more subtrees of "tile" nodes as described earlier. Together these links between nodes notionally form a DAG.

Taking only the manager-to-solver and solver-to-solver unit connections, a strategy for the implementation of the scheme may be described as follows. Initially, the user requests the "manager" for an acoustic field consisting of keyframes of control points that define an acoustic field moving in time, which is expected to be temporally consistent. The "manager" enqueues these, dequeuing them based on their requested time but working ahead in time by a maximum time-of-flight. This maximum time-of-flight value may be defined using one or more of a preset, being computed from the control points, defined by a filtered value, the user or by a heuristic and may be defined on a per-control point basis. On dequeuing, the subtree comprised of "solver" units is sent a request for linear acoustic quantity output estimates, which includes the control point location and normal vector (to ensure that no waves are added to the estimate that travel in a direction inappropriate to the acoustic field goal).

As the estimation results traverse up each solving unit subtree, each "solver" unit node aggregates estimation results by summing the results of its child subtrees. Each child subtree alongside the current node is tagged with the summation to affect a recursive decomposition of the set of solving units, effectively tagging each node link and the node itself with a "breadcrumb", the estimated proportion of the linear acoustic quantity producible by the subtree and node at each control point. Then, when the aggregate estimation results reach the top of the tree, the control points that correspond to the estimates are pushed through the tree a second time effecting the actual solution to the acoustic field generation problem.

The control point definitions in both the estimation and actual solution cases may be the same and simply flow both down and up a communication network tree, they may be queued twice in separate queues or they may be dequeued from the same initial user-supplied control point queue. As the control points traverse the subtrees a second time, they become recursively split or "fissioned" in output acoustic quantity requested using the "breadcrumbs", the estimates set earlier to determine what proportion of the initial user request to fulfil with each subtree.

Setting up the "breadcrumbs" can be achieved using queues to precisely match timings, although because the only time differences are due to communications up and down the tree, timings may be neglected and simple estimation values which may or may not be low pass filtered can be read, as any errors incurred due to mismatches between time steps are likely to be negligible.

As the requested control points reach each "solver" unit, the amount of solution required of the unit is submitted. For both the estimation and the actual solution traversals, the time-of-flight compensation is computed to ensure that any optional transformations into the local solver spatial reference frame is completed with correct reference to the time. If the transducers are moving it is important to resolve the circular dependency between time-of-flight which depends on distance and thus transducer location and any transformations between the global and solver local space which must be computed at emission time which depends on the time-of-flight. The exemplar approximate solution given here, which may be simplified or equally made more involved, is to compute the transform based on the wave coalescence/convergence time, compute an initial transformation and thus an initial time-of-flight and then use this to compute a final transformation and thus a final time-of-flight at emission time. This assumes that the movement of the transducer array over the time-of-flight may not be negligible in terms of spatial shifts at the control point, although if it is known that such shifts will be negligible, the first initial transformation step may be instead made authoritative and final.

Once these have been resolved, the control points incoming to the local "solver" unit are transformed into the local space, adjusted in time using the time-of-flight and queued in a "solver" local control point queue. The remainder of the solution steps, with the phase preset with the heuristic mechanism described may be then computed with linear systems and output to the transducers as described previously, although it is assumed that there is a synchronized clock between all nodes to allow for synchronized output.

B. Variations

One way to define a solver-local time-of-flight is to use the distance from the origin of the solver-local spatial reference frame as computed by the global-to-solver-local transform. This is a way to economize on external data inputs as this indicative central location is then simply implied by the reference frame.

The estimate steps may be used to generate a target phase for the control points. The phase may be obtained as the weighted average time-of-flight from each transducer weighted by the output linear acoustic quantity producible by each. Equally, this could be generated as the shortest time-of-flight from any one transducer. It is possible that there are further heuristics that may be used.

The estimation step can also be made to return information about cross-conversions between various acoustic quantities, including non-linear quantities, as these are often related to the linear acoustic quantities that are the target of the solving process. Further, array apodization information may be added to the estimate query to imply a certain apodization is in effect during the estimation of the other acoustic quantities. Other effects, including interference from other control points, are modelled out by considering them as a random noise function atop the initial estimation and so can be neglected, or otherwise may be added as extra data in the estimation query.

C. Figures

Figure 8:
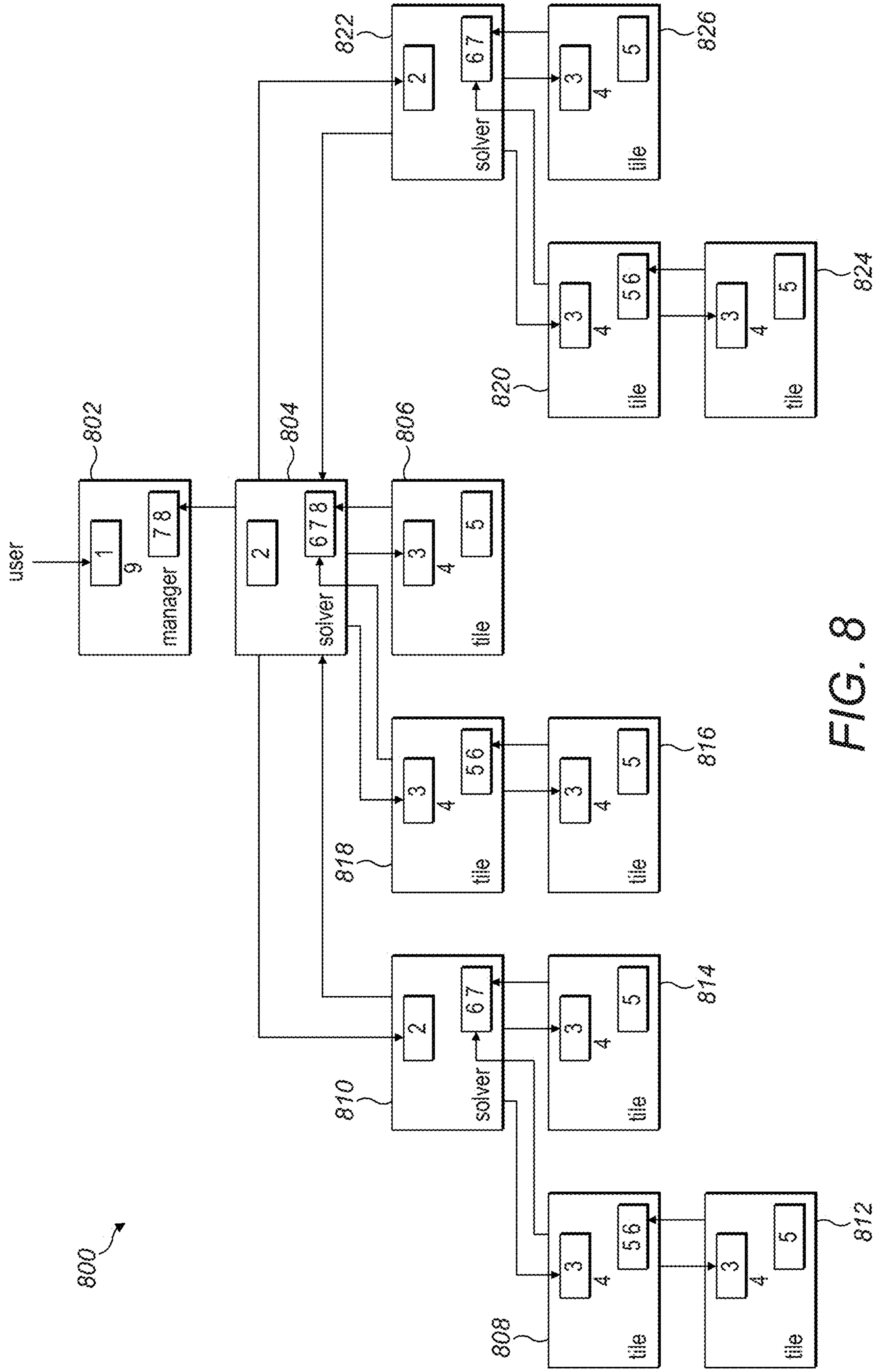
FIG. 8 shows the "Estimation Phase" of a method by which a device generates the desired acoustic field.

Turning to FIG. 8, shown is the "Estimation Phase" 800 of the method by which the device generates the desired acoustic field. The estimation phase may include the following steps:

1. Manager receives new control trajectory points from user 802 with only a convergence time. These points transformed by any pinning spatial transforms specified by the user and are sent to the solver elements 810 804 822.
2. Solver elements each subtract the point location from the center of the solver element group at emission time (ideally, although convergence time may be used). This distance then yields the time-of-flight offset. The points are forwarded to the tiles 808 812 814 818 816 806 820 824 826.
3. Tiles 808 812 814 818 816 806 820 824 826 each transform the point position and normal by the emitter transform at emission time.
4. Tiles 808 812 814 818 816 806 820 824 826 each compute the acoustic quantities formed by approximate basis functions.
5. Tiles 808 812 814 818 816 806 820 824 826 generate exportable estimation data which may involve transformation of any acoustic particle velocity vectors computed by the inverse of the emitter transformation.
6. Tiles 808 812 814 818 816 806 820 824 826 return the estimation data to their parent elements while summing acoustic quantities, drive sums and drive weighted distances, as per the desired phase heuristic in use.
7. Leave a (potentially filtered) copy of the total potential solver output (a selected indicative linear acoustic quantity to use for the linear system solution) at each point on the interface inbound to the summed subtree as a "breadcrumb".
8. Acoustic quantities, drive sums and drive weighted distances from each solver element 810 804 822 are summed.
9. The manager uses the sum total of the limiting acoustic quantities to find conversion factors between the acoustic quantities for the user given points, converting them to a problem posed in terms of an objective value in a linear acoustic quantity, using drive sum and drive weighted distance to find a suitable phase angle for each point.

Figure 9:
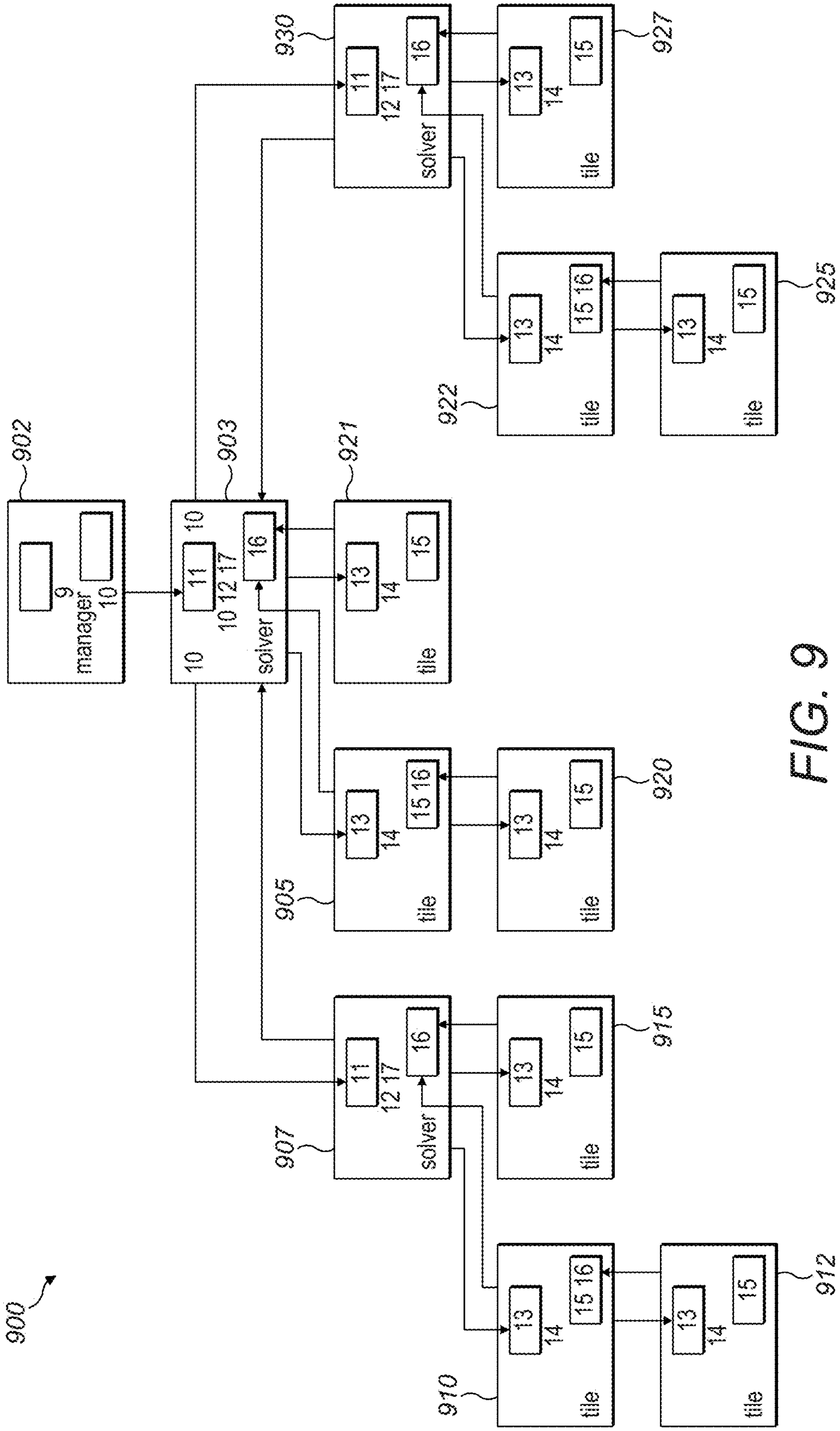
FIG. 9 shows the "Compute Phase" of a method by which a device generates the desired acoustic field.

Turning to FIG. 9, shown is the "Compute Solution" 900 phase of the method by which the device generates the desired acoustic field via a manager 902. The compute solution phase may include the following steps:

1. Each "breadcrumb" is used to divide the acoustic output work amongst the solver element children of each parent element and the parent element itself (if it is a solver element), with the result that each solver element 903 907 930 receives work posed as a fractional problem.
2. Solver elements 903 907 930 each subtract the point location from the center of the solver element group at emission time (ideally, although convergence time may be used). This distance then yields the time-of-flight offset. The points are forwarded to the tiles.
3. The points are scheduled in queues within each solver 903 907 930 according to their emission time, being popped from the queue to be emitted at an appropriate time offset.
4. Tiles 910 912 915 905 920 921 922 925 927 each transform the point position and normal by the emitter transform at emission time.
5. Tiles 910 912 915 905 920 921 922 925 927 compute the core control point relations matrix for their transducers.
6. Tiles 910 912 915 905 920 921 922 925 927 return the core control point relations matrix for their transducers to their parents.
7. The element that is the parent of each tile 910 912 915 905 920 921 922 925 927 subtree sums the core control point relations matrix for each tile 910 912 915 905 920 921 922 925 927 element subtree.
8. Each solver element 903 907 930 solves the specified fractional control point problem in the linear acoustic quantity, obtaining a complex weight for the drive and drive range of each basis set of transducers.

Figure 10:
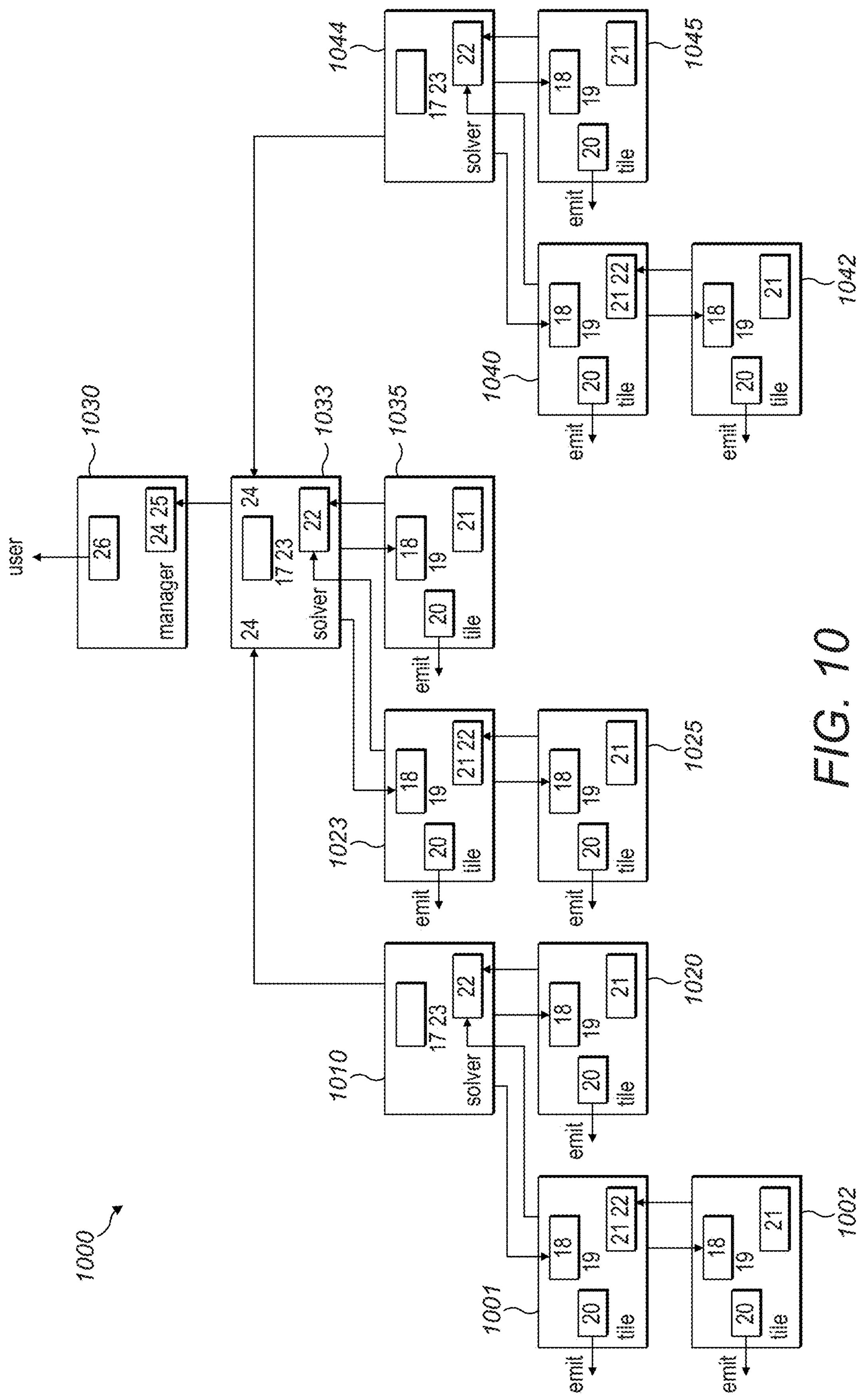
FIG. 10 shows the "Apply Solution Phase" of a method by which a device generates the desired acoustic field.

FIG. 10 shows the "Apply Solution" 1000 phase of the method by which the device generates the desired acoustic field via a manager 1030. The apply solution phase may include the following steps:

1. The solution vectors are transmitted to each tile 1001 1002 10120 1023 1025 1035 1040 1042 1045.
2. Tiles 1001 1002 10120 1023 1025 1035 1040 1042 1045 each expand the local transducer coefficients given by the solution vectors into transducer states, while recording the maximum transducer drive in the range and computing the current contribution to the acoustic field using simulated transducer behavior, where the non-local acoustic and maximum drive data comprise the feedback data.

3. Transducer coefficient data is queued to be emitted at the corresponding emission time.
4. Tiles 1001 1002 10120 1023 1025 1035 1040 1042 1045 return the feedback data.
5. The feedback data is accumulated from the tile elements 1001 1002 10120 1023 1025 1035 1040 1042 1045, summing the acoustic field contributions for this emission time and performing a maximum reduction on the transducer drive range.
6. The timestamps on the feedback data are changed from emission time to convergence time and interpolated to allow them to be synchronously summed and reduced to correctly reflect the effect of producing the points across multiple solver elements 1010 1033 1044.
7. Synchronized feedback data for each timestamp across solver elements 1010 1033 1044 is accumulated.
8. The manager unit receives a synchronous feedback stream to adapt and adjust output power and appropriately set the valid input range.
9. Optional monitoring and status data, including acoustic monitoring information is presented to the user.

III. Conclusion

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Moreover, in this document, relational terms such as first and second, top and bottom, and the like may be used solely to distinguish one entity or action from another entity or action without necessarily requiring or implying any actual such relationship or order between such entities or actions. The terms “comprises,” “comprising,” “has”, “having,” “includes”, “including,” “contains”, “containing” or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by “comprises . . . a”, “has . . . a”, “includes . . . a”, “contains . . . a” does not, without more constraints, preclude the existence of additional identical elements in the process, method, article, or apparatus that comprises, has, includes, contains the element. The terms “a” and “an” are defined as one or more unless explicitly stated otherwise herein. The terms “substantially”, “essentially”, “approximately”, “about” or any other version thereof, are defined as being close to as understood by one of ordinary skill in the art. The term “coupled” as used herein is defined as connected, although not necessarily directly and not necessarily mechanically. A device or structure that is “configured” in a certain way is configured in at least that way but may also be configured in ways that are not listed.

Further, in this specification the overbar operator, as used in expressions such as for example $\overline{\alpha(X_b)}$, is defined as having a real scaling factor on each vector component for prioritizing transducers and thus generating weighted basis vectors in the space of complex-valued transducer activations in addition to the usual meaning of complex conjugation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A device comprising:

first acoustic transducer and a second acoustic transducers for creating an acoustic field; and circuitry configured to:

receive a primitive based on a spatiotemporal modulation circle for manipulating the acoustic field using the first acoustic transducer and the second acoustic transducer, wherein the primitive comprises:

at least one coordinate locations with associated amplitude, at least one transform, and at least one acoustic solver.

2. The device of claim 1, wherein the primitive comprises an amplitude modulation point.

3. The device of claim 1, wherein the primitive comprises a set of sequential points that draw a circle.

4. The device of claim 1, wherein the at least one transform comprises animation transforms and stored transforms.

5. The device of claim 4, wherein the animation transforms are applied to their associated base transform at regular intervals.

6. The device of claim 5, wherein the animation transforms comprise affine transforms.

7. The device of claim 4, wherein the at least one transform generates outputs in 3 dimensions.

8. The device of claim 1, further comprising a ring buffer for a queue that maps onto behavior of the plurality of acoustic transducers along a timeline when a user is actively streaming data to the device, thereby creating past states.

9. The device of claim 8, further comprising future states defining future behavior of the device that are added incrementally to the ring buffer at a write index.

10. The device of claim 9, further comprising present states created by interpolated the future states with past states.

11. The device of claim 1, further comprising a ring buffer for a queue that maps onto behavior of the plurality of acoustic transducers along a timeline, thereby creating past states.

12. The device of claim 11, further comprising new state data generated by extrapolating desired future behavior of the device from the past states.

13. The device of claim 12, wherein the new state data is extrapolated when a user is not actively streaming data to the device.

14. A method comprising:

receiving a primitive based on a spatiotemporal modulation circle, wherein the primitive comprises at least one coordinate location with associated amplitude; at least one transform; and at least one acoustic solver; and driving a first acoustic transducer and a second acoustic transducer according to the primitive to generate an acoustic field.

15. The method of claim 14, wherein the primitive comprises a set of sequential points that draw a circle.

16. The method of claim 14, wherein the at least one transform comprises animation transforms and stored transforms.

17. The method of claim 16, wherein the animation transforms are applied to their associated base transform at regular intervals.

18. The method of claim 16, wherein the animation transforms comprise affine transforms.

19. The method of claim 16, wherein the at least one transform generates outputs in 3 dimensions.

20. The method of claim 14, further comprising a ring buffer for a queue that maps onto behavior of the plurality of acoustic transducers along a timeline when a user is actively streaming data to a device, thereby creating past states.

* * * * *